(12) United States Patent
De Melo Casado Matos et al.

(10) Patent No.: US 12,247,904 B2
(45) Date of Patent: Mar. 11, 2025

(54) METHOD AND SYSTEM FOR MEASURING THE CHARACTERISTICS OF A MULTIPHASE FLOW

(71) Applicants: Universidade Estadual De Campinas—UNICAMP, Campinas (BR); Petróleo Brasileiro S.A.—Petrobras, Rio de Janeiro (BR)

(72) Inventors: Pedro Henrique De Melo Casado Matos, Brasília (BR); Saon Crispim Vieira, Santos (BR); Daniely Amorim Das Neves, Brasília (BR); Juliana Rangel Cenzi, Jacareí (BR); Adriano Todorovic Fabro, Brasília (BR); Marcelo Souza De Castro, Campinas (BR); Charlie Van Der Geest, Campinas (BR); Daiane Mieko Iceri, Campinas (BR); Bernardo Pereira Foresti, Paulinia (BR); Marcos Pellegrini Ribeiro, I, Petrópolis (BR)

(73) Assignees: Petróleo Brasileiro S.A.—Petrobras, Rio de Janiero (BR); Universidade Estadual De Campinas—UNICAMP, Campinas (BR)

(*) Notice: Subject to any disclaimer, the term of this patent is extended or adjusted under 35 U.S.C. 154(b) by 217 days.

(21) Appl. No.: 18/073,051

(22) Filed: Dec. 1, 2022

(65) Prior Publication Data
US 2023/0175941 A1  Jun. 8, 2023

(30) Foreign Application Priority Data
Dec. 2, 2021 (BR) .................. 10 2021 024428 3

(51) Int. Cl.
*G01N 11/04* (2006.01)
(52) U.S. Cl.
CPC .................................. *G01N 11/04* (2013.01)
(58) Field of Classification Search
CPC ...................................................... G01N 11/04
See application file for complete search history.

(56) References Cited

U.S. PATENT DOCUMENTS

| | | | | |
|---|---|---|---|---|
| 5,218,871 A | * | 6/1993 | Cody | G01F 1/74 73/861.04 |
| 5,415,048 A | * | 5/1995 | Diatschenko | G01F 1/88 73/861.04 |
| 6,412,352 B1 | * | 7/2002 | Evans | G01F 1/666 73/861.04 |

* cited by examiner

*Primary Examiner* — Jamel E Williams
(74) *Attorney, Agent, or Firm* — Mintz, Levin, Cohn, Ferris, Glovsky and Popeo, P.C.

(57) ABSTRACT

The present invention relates to a method and system for measuring characteristics of a multiphase flow from structural vibration signals. In this sense, the objectives of the invention are achieved by means of a method for measuring characteristics of a multiphase flow from structural vibration signals which comprises: obtaining, by means of acceleration sensors (V01, V02, T00) externally fixed to a pipeline, signals based on pipeline internal flow vibration; processing, by means of a processing device, the obtained signals; and determining a dispersion curve fitting coefficient to determine the void fraction of the mixture.

7 Claims, 25 Drawing Sheets
(17 of 25 Drawing Sheet(s) Filed in Color)

(a) 7. Intermittent: $v_{sl} = 0.6 m/s$, $v_{sg} = 5.4 m/s$ (b) 13. Intermittent: $v_{sl} = 1.3 m/s$, $v_{sg} = 5.6 m/s$ (c) 23, transition: $v_{sl} = 2,5 m/s$, $v_{sg} = 3,5 m/s$ (d) 29, scattered bubbles:
$v_{sl} = 4.5 m/s$, $v_{sg} = 0.6 m/s$ (e) 33, scattered bubbles:
$v_{sl} = 6.3 m/s, v_{sg} = 0.7 m/s$ (a) Intermittent (b) scattered bubbles (a) Intermittent: $v_{sl} = 0.67 m/s$ (b) Intermittent: $v_{sl} = 1.32 m/s$ (c) Intermittent: $v_{sl} = 1.93 m/s$ (d) Intermittent: $v_{sl} = 2.71 m/s$ (e) Intermittent: $v_{sl} = 3.76 m/s$

METHOD AND SYSTEM FOR MEASURING THE CHARACTERISTICS OF A MULTIPHASE FLOW

CROSS-REFERENCE TO RELATED APPLICATION

This application claims priority to Brazilian Application No. 10 2021 024428 3, filed on Dec. 2, 2021, and entitled "METHOD AND SYSTEM FOR MEASURING THE CHARACTERISTICS OF A MULTIPHASE FLOW," the disclosure of which is incorporated herein by reference in its entirety.

FIELD OF THE INVENTION

The present invention relates to a method and system for measuring characteristics of a multiphase flow from structural vibration signals.

The application technological field of the present invention is the mechanical field, more precisely the fields of fluid mechanics and vibrations, aimed at obtaining characteristics of a multiphase flow, such as flow pattern, phase fractions, velocities, etc., indirectly, from non-invasive sensors.

BACKGROUND OF THE INVENTION

Multiphase flows are present in several applications in the field of engineering, such as nuclear power plants and oil production. It is of paramount importance the knowledge in situ about the different flow patterns that develop inside the pipelines in order to obtain the proper security of the system and the optimization of the processes involved.

Thus, monitoring techniques have been developed over the past decades, based on different principles, applied to a wide variety of sensors that are used to measure and obtain characteristics of two-phase flows in pipelines and pipelines. pipes.

Some of the techniques currently used are based on measurements through the use of intrusive sensors, that is, sensors that are placed inside the pipes, along with the flow. As an example, electrical sensors can be used, being inserted in the flow to detect the passage of each phase of the multiphase flow by means of differences in the resistivity or capacitance measured by the sensor, altered according to the amount of each phase present in the flow. This methodology presents a difficulty in application because its system is intrusive to the flow, being difficult to apply mainly in places of high danger, such as at the bottom of oil wells or due to contact with food in the food industry. Furthermore, in applications under high temperature conditions, as in the case of thermoelectric plants, it is not possible to insert electrical sensors inside the ducts.

Other techniques used consist of obtaining the void fraction (temporal average of the cross-sectional area fraction of the duct occupied by the gas, considering a characteristic period of the flow) based on images acquired by high-speed and high-definition cameras. However, this technique requires a specific pipeline (transparent), which allows adequate visualization of the flow, and also accessibility to the measurement site.

Furthermore, another technique used to measure the characteristics of biphasic or multiphase flows is the use of ultrasonic sensors. This technique requires the use of "shaker" type exciters or any other energy injection device that excites the pipeline at an ultrasound frequency, and consequently the sensors.

There are also industrial multiphase meters that use complex techniques such as microwaves, radiation, among others for measurement and, therefore, such meters are of restricted or dangerous use.

With this in mind, the present invention presents a solution for indirectly quantifying the portions of liquid and gas phases (fraction of phases) that make up the mixture of a multiphase flow (comprising liquids and gas) inside ducts, from the analysis of structural vibration measurements, as a result of the flow passing through the pipeline.

More specifically, the solution is reached by means of a method and a system for measuring characteristics of a multiphase flow. The methods and products are simple to use, and the implemented devices/sensors can be fixed by any type of appropriate support, without the need for external excitation mechanisms, and based on the analysis of the signals obtained with the vibration sensors installed in the pipeline. Thus, the vibration sensors of the present invention allow their application in places of difficult access or in applications where electrical sensors, for example, cannot be used, and since they are external, they are not intrusive to the flow.

Furthermore, the solutions proposed by the present invention can be applied to areas involving the transport of fluid mixtures inside ducts, such as, for example, in the petrochemical, food, chemical, nuclear, aerospace industry, among others.

DESCRIPTION OF THE STATE OF THE ART

The search for the subject invention history found some documents that reveal subject matters within the technological field of the present invention.

One document describing matter related to such technology is U.S. Pat. No. 6,412,352, which describes a non-invasive method and apparatus for measuring the mass flow of a multiphase fluid. However, the document uses only one sensor to estimate mass flow and void fraction. In addition, the technique used requires performing calibrations in situ for each application, which is sometimes unfeasible.

Unlike the aforementioned document, the present invention uses more than one sensor to evaluate the dispersion curve of the structure and estimate the void fraction. Furthermore, as the present invention does not use a single acceleration sensor, it is not necessary to assess which regions of the frequency spectrum are influenced by the pump/structure and filter them. Finally, the proposed invention does not require a calibration for different lines, as in the cited patent document.

U.S. Pat. No. 5,415,048 discloses a multi-phase fluid flow meter based on passive and non-intrusive acoustics for use in pipe field applications. However, the technology uses an accelerometer in conjunction with pressure sensors. In addition, calibration is required with various proportions of liquid and gas, and the properties of the fluids must be similar to those of the fluids encountered in the application scenario. On the other hand, the proposed invention dispenses the use of pressure sensors, which installation could require a production stop, and uses only acceleration sensors. Furthermore, the present invention also dispenses the prior calibration, whether using piping or specific means in predetermined proportions, as is the case of the cited patent document.

U.S. Pat. No. 5,218,871 discloses a method for measuring the mass flow rate of liquid flow exiting a two phase (gas/liquid) feed nozzle. However, as only the liquid mass flow is measured, the document in question is insensitive to gas flow. In addition, other important factors are not taken into account to measure the void fraction, such as the geometric arrangement of the flow phases and the sliding between them. Unlike the cited document, which measures only the liquid mass flow, the present invention measures the flow void fraction, that is, advantageously, the present invention makes it possible to measure the portions that make up the mixture of the two phases present in the flow and not just one phase. As the void fraction also depends on the geometric arrangement in which the phases are and, consequently, on the slippage between the phases, which causes acceleration/deceleration of the phases in the pipeline, measuring only the mass flow of one phase has no direct relationship with the void fraction.

Patent document relates to a method for a non-intrusive determination of respective flow rates of constituents in a two-phase fluid flowing in a conduit. However, obtaining the flow rates for each phase using the document's methodology is based on phenomenological models, so that the void fraction is obtained indirectly. Contrary to what the aforementioned patent document describes, the present invention is able to obtain the fraction void of the mixture without using phenomenological models.

The non-patent document *Flow Measurement by Piezoelectric Accelerometers: Application in the Oil Industry* describes the methodology to analyze a recently developed flow measurement technique, based on the vibration captured by an accelerometer attached to the surface of the pipeline for use in the oil industry. The applied methodology consists of carrying out an experimental study to obtain data in an accredited laboratory for calibrating flow meters, estimating a flow rate for each measured vibration, followed by an uncertainty analysis. However, the method in the related document refers to the single-phase flow measurement, therefore, it is not related to the estimation of the gas volumetric fraction (FVG—"fração volumétrica de gás"), a multiphase flow parameter. Furthermore, the cited document does not estimate the void fraction, as in the present invention. Furthermore, advantageously, the present invention can estimating the FVG, a parameter used in the optimization of methods of artificial oil elevation and, therefore, in the optimization of production, contrary to the approach used by the cited document.

The non-patent document *Vibration "response of a pipe subjected to two-phase flow: Analytical formulations and experiments"* refers to vibration induced by two-phase flow in tubes. A wide range of two-phase flow conditions, including bubble, dispersed and slug flow, was tested on a straight horizontal pipe with clamp. The vibration response of both transverse directions for two gap lengths was measured. From experimental results, a in-depth discussion on the nature of flow excitation and the influence of flow parameters is presented. However, the related document does not estimate the void fraction, it only presents an analysis between the peak frequency of the acceleration signals with the void fraction. Furthermore, the presented peak frequencies directly depend on the mechanical fastening of the pipeline. Unlike what is described in this document, the present invention proposes a methodology that estimates the void fraction, through a system that is easy to install and maintain, does not require calibration for different lines and is non-invasive.

Finally, the document *Two-Phase Mass Flow Measurement Using Noise Analysis* develops a non-intrusive and low-cost mass flow measurement sensor for two-phase flow conditions in geothermal applications. The work emphasis is the production of a device that will monitor the two-phase flow in above ground pipeline systems. However, the document refers to the use of a sensor in which the signal processing consists of filtering the signal in time and estimating only the mass flow from the standard deviation of the acquired signal. The measurement of the mass flow of the two-phase flow requires previous calibration for each pipeline, in addition, for high void fraction values (>10%) the relationship between standard deviation and mass flow decreases. With a different approach from the one proposed by the cited document, the present invention uses a system comprising more than one acceleration sensor to estimate the dispersion curve of the structure and estimate the void fraction. Additionally, the proposed invention measures the void fraction of the flow without taking into account the mass flow, while the non-patent document proposes a methodology to measure the mass flow for two-phase flows with a void fraction of up to 10%.

BRIEF DESCRIPTION OF THE INVENTION

The present invention relates to a method and system for measuring characteristics of a multiphase flow from structural vibration signals. A solution is proposed to quantify the portions of liquid and gaseous phases (fraction of phases) that make up the mixture of a multiphase flow (composed of liquid and gas) inside ducts or tubes, indirectly, based on the measurement analysis of structural vibration, due to the passage of said flow through the pipeline. It is still an objective of the present invention to provide a solution that can be used in any type of piping (rigid or flexible, in this case provided it is locally rigid) and in areas of difficult access (such as, for example, undersea. Furthermore, it is also an objective of the present invention to provide a simplified solution that is independent of external excitation mechanisms and devices.

The present invention comprises a method for measuring characteristics of a multiphase flow from structural vibration signals characterized by comprising obtaining, by means of sensors attached externally to a pipeline, signals based on pipeline internal flow vibration; processing, by means of a processing device, the obtained signals; and determining a dispersion curve fitting coefficient to determine the void fraction of the mixture.

Furthermore, the present invention comprises a system for measuring characteristics of a multiphase flow from structural vibration signals characterized by comprising: at least three sensors; and a processing device; wherein the sensors are attached externally to a pipeline and configured to obtain signals based on the pipeline internal flow vibration; the processing device being configured to process the obtained signals and determining a dispersion curve fitting coefficient to determine the void fraction of the mixture.

BRIEF DESCRIPTION OF THE FIGURES

The patent or application file contains at least one drawing executed in color. Copies of this patent or patent application publication with color drawing(s) will be provided by the Office upon request and payment of the necessary fee.

The present invention will now be described below with reference to the typical embodiments thereof and also with reference to the attached drawings, in which.

DETAILED DESCRIPTION OF THE INVENTION

The following detailed description should be read and interpreted with reference to the accompanying drawings and diagrams, representing a preferred embodiment of the invention, and is not intended to limit the scope of the invention.

As previously described, the invention falls within the field of mechanics and refers to a method and system for measuring characteristics of a multiphase flow from structural vibration signals.

The present invention refers to methods and systems that are intended to analyze the effects of multiphase flow, preferably (but not exclusively) two-phase flow, on the structural dynamics of a pipeline in terms of wave propagation. With this in mind, a method and a system are provided to estimate the local void fraction, i.e., the ratio between the volume of the gaseous phase and the total volume of fluid, from sensors (accelerometers) fixed on the external face of the pipeline.

Figure 1:
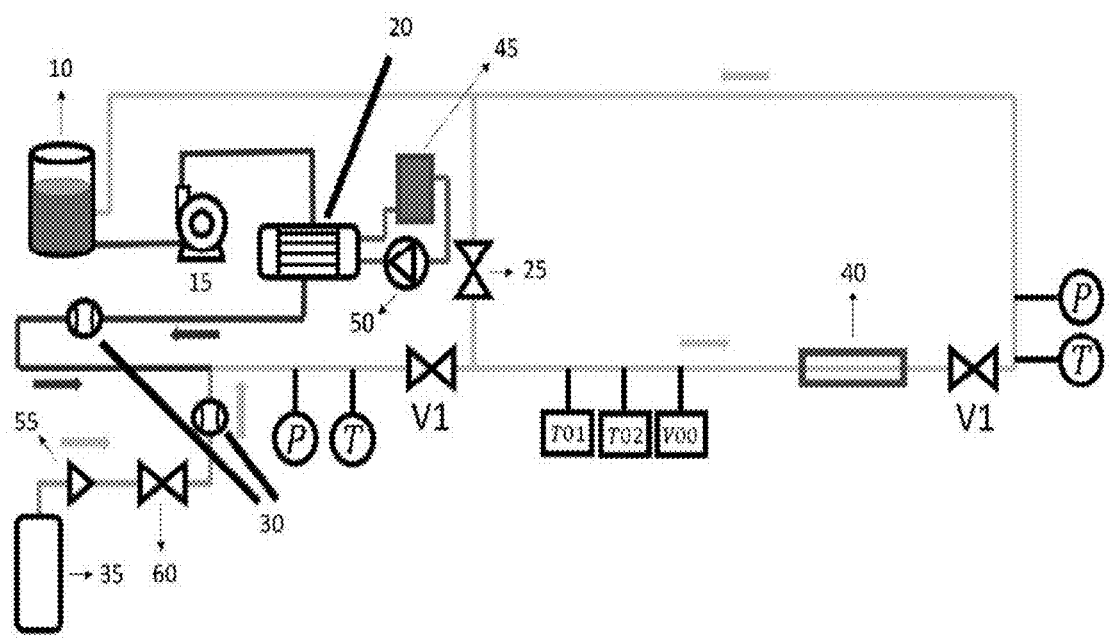
FIG. 1 shows a schematic diagram of an experimental test apparatus, according to an exemplary application of the present invention.

FIG. 1 is a schematic diagram of an exemplary embodiment of an experimental apparatus for testing the present invention. As can be seen in FIG. 1, the structure's response to flow is measured at different points along a test section using acceleration sensors, or accelerometers (T01, T02, V00). For the flow, the flow rates of each phase (gas and liquid) are measured, which are controlled remotely from a frequency inverter connected to the pumps.

The test section is installed in a loop, as shown in FIG. 1. Water is stored in a reservoir (10) and pumped through a centrifugal pump (15). For the gas, a needle type flow control valve (60) is used, connected to a pressure regulating valve (55) and an air compressor (35) that injects the gas into the pipeline. At the end of the test loop, the water returns to the reservoir (10) and the air to the atmosphere. The test section also has a heat exchanger (20) responsible for transferring thermal energy between the water from the centrifugal pump (15) and the heating water that passes through a water cooler (45) of the "chiller" type and by a pump (45). Additionally, the section presents quick actuation valves (V1) for quick closing of the test section and opening of the "by-pass" valve (25), in order to measure the phase fraction ("hold-up") by the quick closing valve system. Pressure (P) and temperature (T) sensors are arranged at points in the section to measure these flow parameters.

The flows are measured by means of sensors of the type "Coriolis" (30). At the end of the test line, a viewing section (40), consisting of an acrylic tube, is installed in which a high-speed camera is positioned in order to record the flow pattern developed for the two-phase case. All data is obtained through an analog-to-digital converter connected to a control computer comprising a processing device, and the flow rates are also controlled by the computer.

According to an exemplary configuration, as shown in FIG. 1, at least three accelerometers, indicated by (T01, T02, V00), are arranged externally to the pipe and equally spaced from each other. The main function of the accelerometers (T01, T02, V00) is to obtain pipeline acceleration data due to two-phase flow so that a dispersion curve can be determined for the flow pattern. In addition to the dispersion curves, it is also foreseen by the present invention that the power spectra of the acceleration signals obtained by the accelerometers (T01, T02, V00) identify the natural frequencies of the structure and define boundary conditions.

Next, according to an exemplary configuration of the present invention, the approach used to estimate the void fraction that makes up a biphasic mixture will be presented in detail, based on the measurement of the structural vibration performed by the accelerometers (T01, T02, V00) in three distinct equidistant points, arranged externally to the pipe, where there is an internal two-phase flow.

Initially, the waves behavior that propagate in the structure must be evaluated, so that the type of structural equation to be followed can be defined. The methodology starts from the equation for the Euller-Bernoulli beam model, as follows:

$$\left(\rho_t A_t EI \frac{\partial^4 w}{\partial x^4} + \rho_m A_i\right)\frac{\partial^2 w}{\partial t^2} + 2\rho_m A_i U \frac{\partial^2 w}{\partial t \partial x} + \rho_m A_i U^2 \frac{\partial^2 w}{\partial x^2} = 0 \quad (1)$$

where, w is the displacement of the pipeline/duct in bending, in a position x and at a given instant of time t, EI, is the flexural stiffness of the pipeline, $\rho_t$ and $\rho_m$ are the specific masses of the pipeline material and the fluid, respectively, At and Ai the cross-sectional and internal areas, respectively and U is the flow velocity. The terms $$2\rho_m A_i U \frac{\partial^2 w}{\partial t \partial x} \text{ and } \rho_m A_i U^2 \frac{\partial^2 w}{\partial x^2}$$

are the gyroscopic and centrifugal effects of the equation, respectively, generated due to internal fluid flow.

Considering equation (1) above, harmonic motion in time and space of w and to obtain the analytical dispersion equation of the system, given by:

$$EIk^4 - (\rho_t A_t + \rho_m A_i)\omega^2 + 2\rho_m A_i U k \omega - \rho_m A_i U^2 k^2 = 0 \quad (2)$$

where k is the flexural wavenumber and ω is the angular frequency.

Then, the importance of the gyroscopic and centrifugal terms is determined to define the lowest admissible frequency ω within the considered flow velocities. For this, the dispersion curve is calculated, that is, the flexural wavenumber K in function of harmonic frequency, with all the terms of equation (1) and without the gyroscopic and centrifugal terms. The frequency band and flow velocities where the difference between these two curves is less than 6% is considered the validity region of the methodology implemented according to an exemplary configuration of the present invention.

Figure 2:
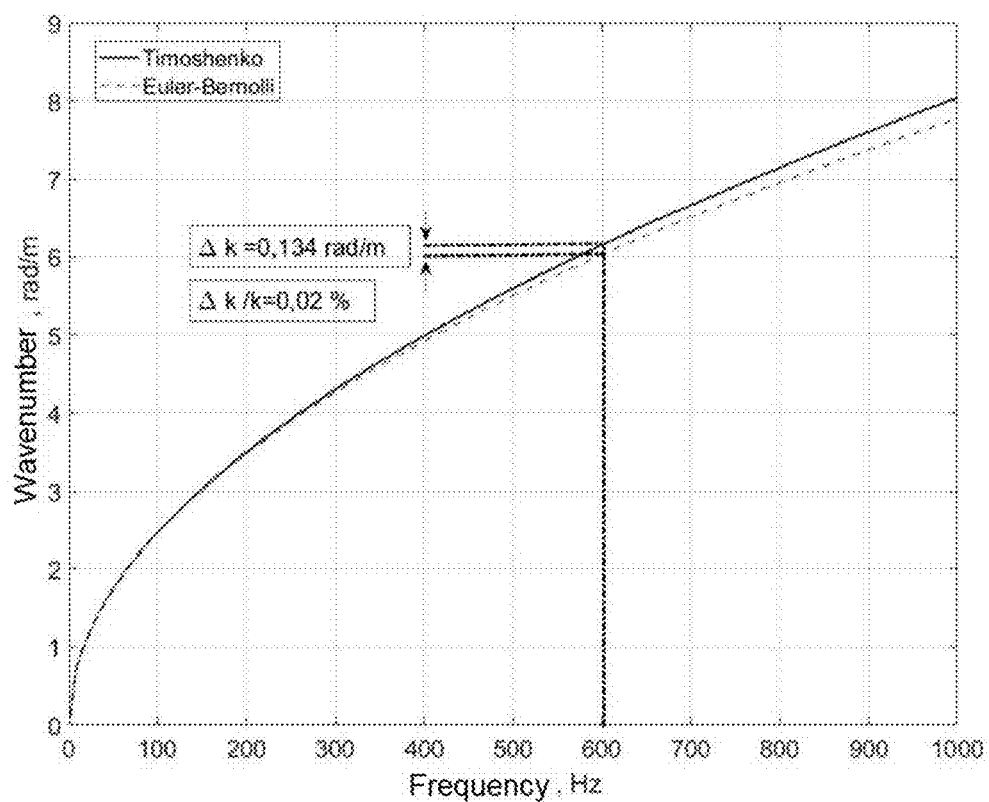
FIG. 2 shows a dispersion curve obtained for a simple beam using the Euller-Bernoulli and Timoshenko models, according to an exemplary application of the present invention.

Once the flow velocity at which this methodology is valid is defined, it is necessary to estimate the maximum frequency of validity of the methodology. The maximum frequency is obtained by comparing the behavior of the Euller-Bernoulli and Timoshenko beam models, as exemplified in FIG. 2. Thus, the dispersion curves are obtained from the two models, for the maximum flow velocity at which this methodology is valid, as obtained in the previous step.

More specifically, regarding the maximum flow velocity, also called critical flow velocity, it is predicted that it can be determined from the application of a modal analysis, starting from the motion equation (1) and boundary conditions. This maximum flow velocity represents the critical velocity, at which the structure begins to vibrate in an unstable manner, which may cause failures. It is known that the natural frequency of the tubular section decreases as the flow velocity increases, until it reaches the critical value at which the natural frequency reaches a null value and instabilities in the system occur. The maximum or critical flow velocity is given by:

$$v_c = \frac{\beta}{L}\sqrt{\frac{EI}{\rho_f A_i}} \quad (3)$$

Where β is a constant that depends on the boundary conditions of the system, L is the length of the tube and $\rho_f$ is the specific mass of the flow.

Still, the approximate relationship between the natural frequency with and without flow is described by the equation:

$$\frac{f_0}{f_n} = \left(1 - \left(\frac{v}{v_c}\right)^2\right)^{1/2} \quad (4)$$

Where $f_0$ is the natural frequency of the structure subject to flow with velocity v and $f_n$ is the natural frequency of the structure without flow.

The critical flow velocity for which the first natural frequency becomes zero is calculated from equation (3) and for a bi-supported boundary condition where the value of β is the same as π. This critical speed value found for experimental conditions of the present invention is approximately 115 m/s. It is worth noting that the flow velocity only has a significant influence on the pipeline dynamics when it reaches values close to the critical velocity. Furthermore, the typical values of flow velocity found in engineering practices range from 0 to 10 m/s in intervals of 2 m/s, well below the critical velocity, which corroborates to the wide applicability of the methodology described here.

When comparing the dispersion curves for Euller-Bernoulli and Timoshenko, for the same flow conditions, it is considered that the maximum frequency for this methodology occurs when the dispersion curves present a difference of 2% in frequency.

From the maximum possible frequency, valid by the Euller-Bernoulli beam analysis, it is possible to obtain the wavelength equivalent λ to the maximum frequency. It will be appreciated by one skilled in the art that wavelength is related to wavenumber k this way:

$$k = \frac{2\Pi}{\lambda}. \tag{4}$$

With the maximum value of the wavelength obtained, the minimum distance (d) between two consecutive sensors of the at least three sensors (T01, T02, V00) is estimated using the following equation:

$$d = \frac{\Pi}{k_{m\acute{a}x}}. \tag{5}$$

As noise and experiment conditions can cause small differences in system response (stochastic systems), it is important to use techniques for random signals that take into account response estimators. The estimation of the frequency response function (FRF), via power spectral density (DEP—"densidade espectral de potência"), is an extremely useful technique for this purpose.

Therefore, the data obtained by the acceleration sensors (T01, T02, V00) are analyzed. Based on the measured signals, the Frequency Response Function (FRF) of the 3 signals, given by $A_1$, $A_2$ and $A_2$, which are the frequency response function (FRF) amplitudes of the acceleration sensors (T01, T02, V00), is estimated using the central accelerometer (T02) as a reference.

Preferably, according to an exemplary configuration of the present invention, the central accelerometer (T02) is used as the reference accelerometer, since two signals are needed, one delayed or advanced in relation to the other, to obtain the crossed power spectral density (DEP) to calculate the frequency response function (FRF) estimator. The consequence of this is that, for the central accelerometer (T02), the amplitude of the frequency response function (FRF) will be constant and equal to 1 and the phase will be constant and equal to zero.

From the relationship between the 3 frequency responses of the vibration signals, the experimental wavenumbers of pipeline bending $k_{exp}$ are estimated as a function of angular frequency, through the relationship:

$$k_{exp} = a\cos\left[\frac{(A_1 + A_3)}{2A_2}\right]/d \tag{6}$$

where, a cos is the arc cosine, d is the minimum distance between two consecutive sensors and A1, A2 and A3 are the frequency response function (FRF) amplitudes of the acceleration sensors (T01, T02, V00).

Next, a curve fitting method is applied, based on the estimation of the dispersion curve with the 3-point method based on the DEPs of each accelerometer. It will be appreciated by a person skilled in the art that the 3-point method consists of a technique, or methodology, for identifying dispersion curves that correlates the phase of the signal measured at three distinct points in space (accelerometers T01 T02 V00), in order to obtain the dispersion characteristics of this signal.

The fitted curve obtained, therefore, has the form of the following equation:

$$y = ax^{\frac{1}{2}} \tag{7}$$

wherein the wavenumber k is related to y axis and the angular frequency is related to x axis, as can be seen in the equation below:

$$k = a\omega^{\frac{1}{2}}. \tag{8}$$

Thus, the coefficient a of the fitting curve is a function of the specific mass of the mixture $\rho_m$, according to the equation below:

$$a = \sqrt[4]{\frac{\rho_t A_t + \rho_m A_i}{EI}} \tag{9}$$

where, $\rho_t$ and $\rho_m$ are the specific masses of the pipeline material and the fluid mixture, respectively, HI is the flexural stiffness of the tube, $A_t$ and $A_i$ are the cross-sectional and internal areas, respectively.

Once the specific mass of the mixture is obtained, the next step is to determine the void fraction of the mixture, through the weighted average of the specific mass of each phase, calculated as follows:

$$\rho_m = \alpha\rho_{g\acute{a}s} + (1-\alpha)\rho_{l\acute{i}quido} \tag{10}$$

Where, α equals to the void fraction value.

Figure 3:
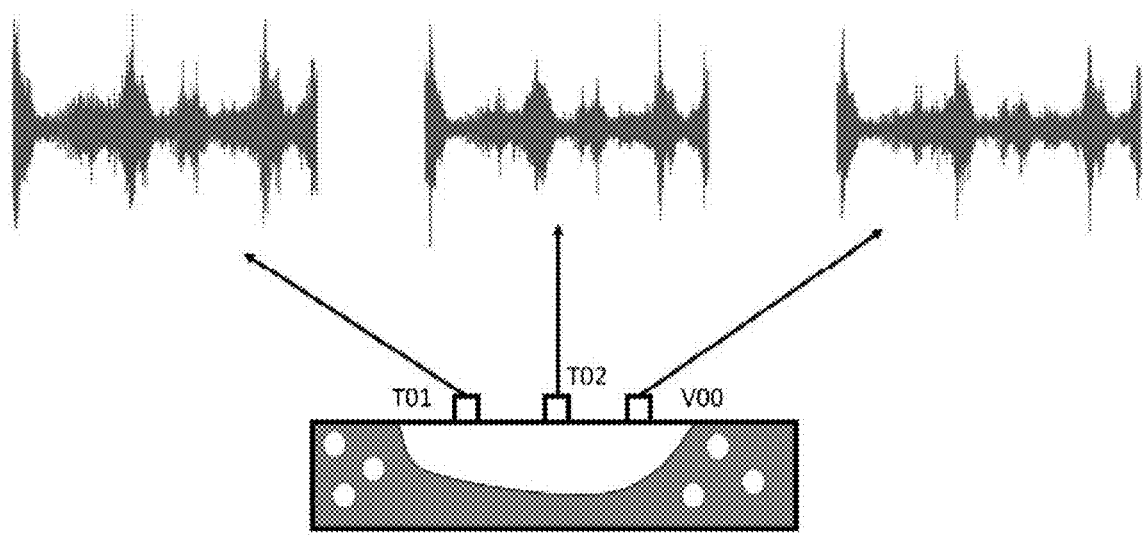
FIG. 3 presents a simplified scheme of the system with at least three sensors arranged on a pipeline in a multiphase flow regime, where the time signals are obtained, according to an exemplary application of the present invention.
Figure 4:
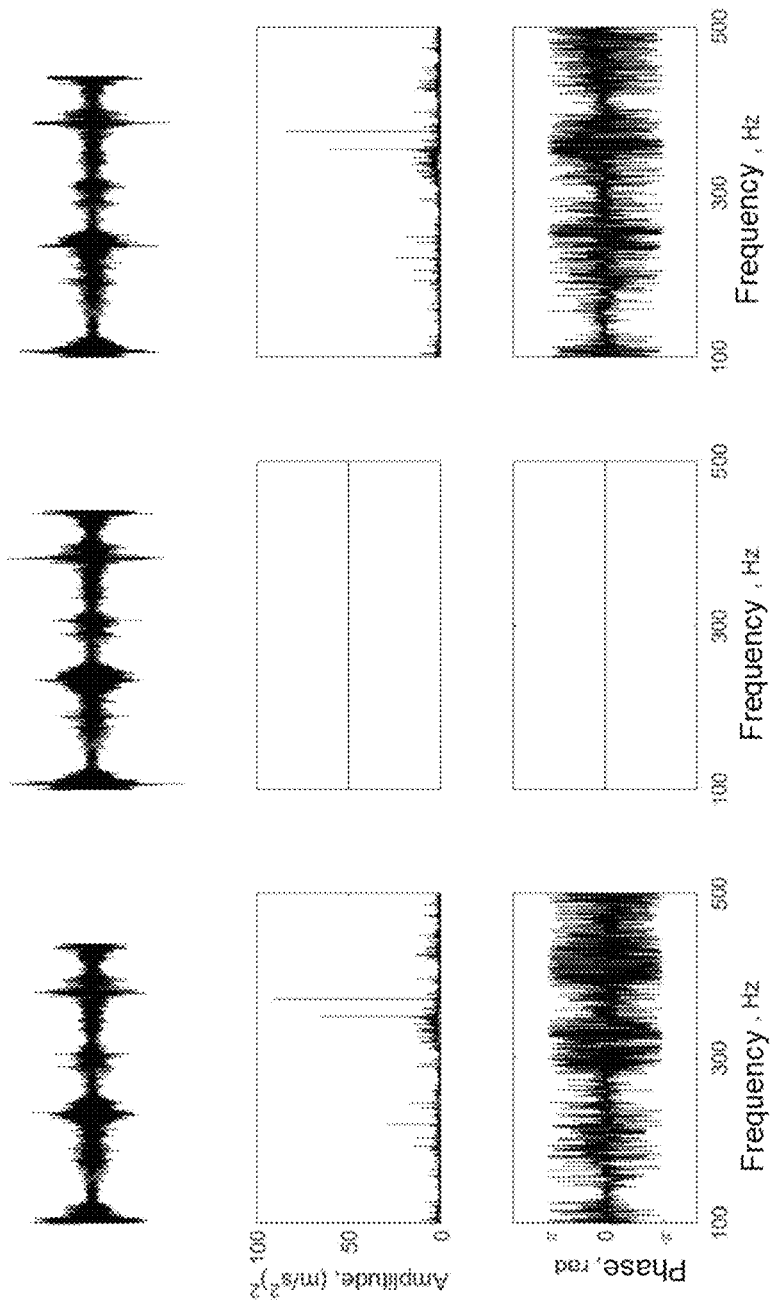
FIG. 4 shows the calculation of the Frequency Response Functions (FRFs) from the timing signals of the sensors, according to an exemplary application of the present invention.
Figure 5:
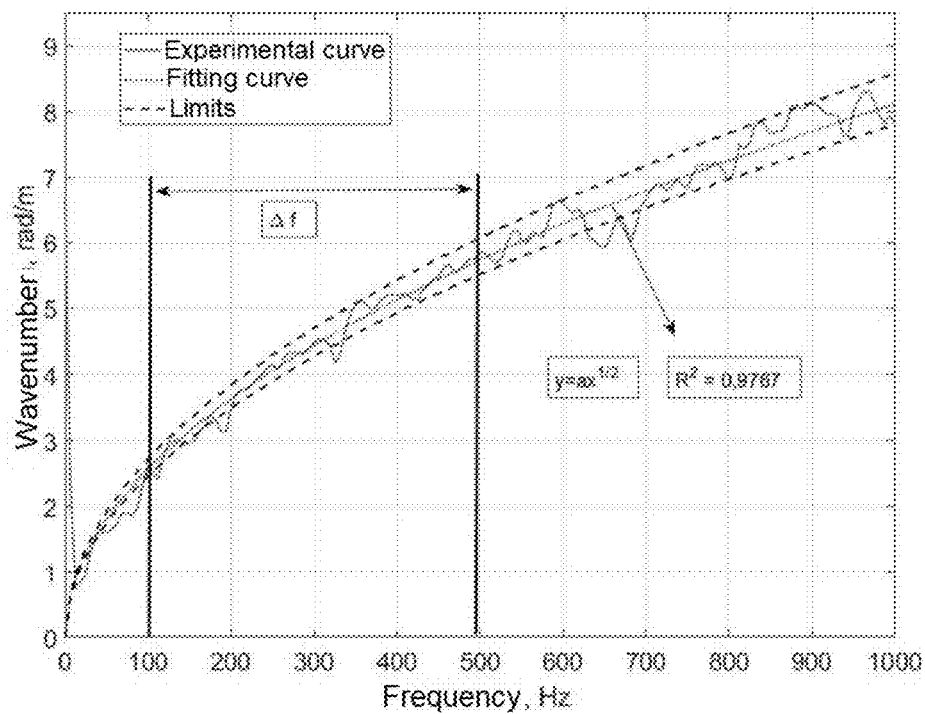
FIG. 5 shows an experimental dispersion curve, a fitted curve, and the upper and lower limits of confidence intervals, according to an exemplary application of the present invention.

Furthermore, according to an exemplary configuration of the present invention, FIGS. 3 to 5 show an exemplary application of the methodology adopted, from obtaining the temporal signals by the sensors to the determination of the void fraction.

FIG. 3 shows the at least three acceleration sensors (accelerometers) positioned externally to the pipeline, in which the temporal acceleration signals are thus obtained based on the vibration of the pipeline caused by the internal flow of the pipeline.

The signals obtained by at least three accelerometers (T01, T02, V00) are processed by a processing device to obtain Power Spectral Densities (DEPs) and Frequency Response Functions (FRFs) for each of the signals, as shown in FIG. 4.

In the next step, the three-point method is used based on the DEPs of each accelerometer (T01, T02, V00) to obtain a dispersion curve, as shown in an illustrative manner in FIG. 5. This fitting curve is used in the curve fitting function of the non-linear least squares. The outputs of the function are the fitting coefficient $a_1$, and the quality of fit given by a parameter called R-square Finally, as previously described, based on the obtained fitting coefficient, the void fraction is determined.

The present invention dispenses the use of "shaker" impact hammer, or any other energy-injecting device. Therefore, the structure is excited by the flow itself, so that, to estimate the dispersion curves, it is possible to use only at least three accelerometers, one of them being the reference. The phase difference between the measurement accelerometers and the reference accelerometer is sufficient to estimate the dispersion curve using the three-point method for curve fitting. The use of excitation by the flow itself is justified by the fact that turbulence excites the structure in a wide frequency band.

The processing device to which the invention relates refers to one or more processors capable of processing the signals obtained from the sensors and which are part of a computing device, which can be understood as one or more computers. The processing device may include a microprocessor, microcontroller, processing module, integrated circuit, or any other related computing device.

Further, it is foreseen by the present invention, that the sensors can be coupled to the pipeline by means of an appropriate support, glued, or inserted from magnets that facilitate its insertion in the surface and provide application flexibility in submerged pipelines. Implementation example: Experimental Results for Biphasic Flow Experimental tests for applying the methodology above described in the present invention to obtain the void fraction were conducted using air-water experimental points and the results are presented below.

For the tests carried out, the material and geometric properties of the pipeline are found in table 1, in which E is the modulus of elasticity, $\rho$ is the specific mass, $d_i$ is the internal diameter and h is the thickness of the wall.

TABLE 1

| E (GPa) | $\rho$ (kg/m$^3$) | $d_i$ (mm) | h (mm) |
|---|---|---|---|
| 209.55 | 7270.4 | 50.8 | 3.5 |

Appropriate operating conditions were chosen to develop different two-phase liquid-gas flow patterns, using water for the liquid and air for the gas. The experimental acceleration data and the three-point method are used to obtain the dispersion curve for different flow patterns.

Figure 6:
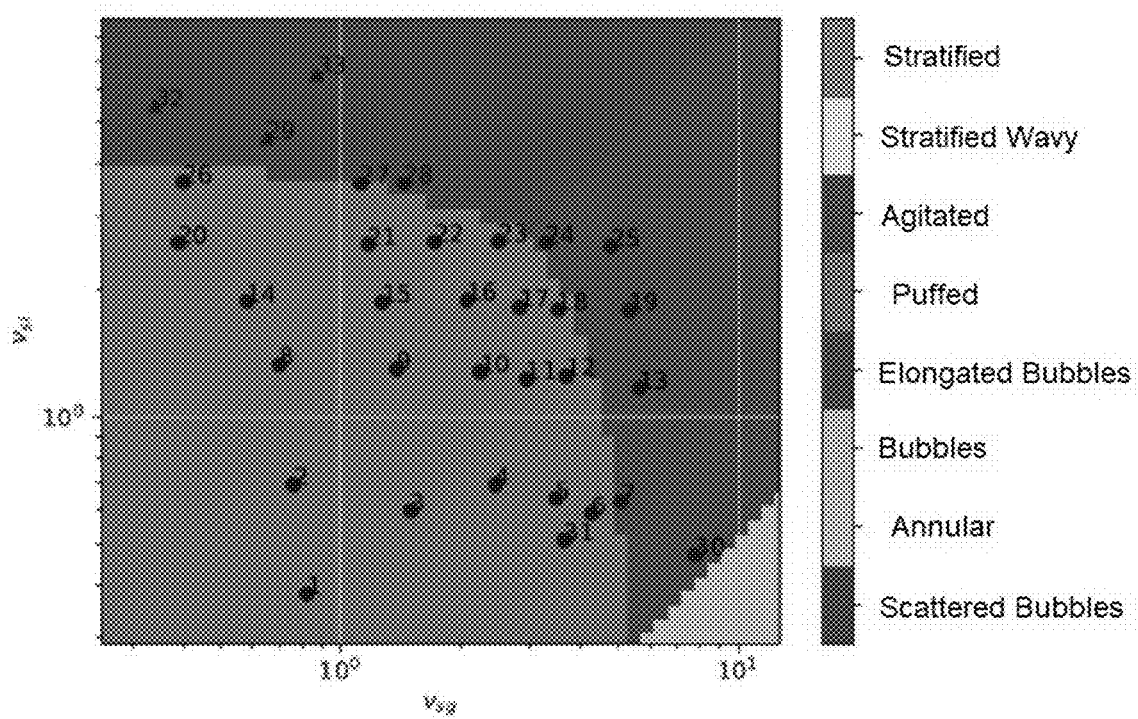
FIG. 6 shows a flow pattern map and considered experimental points, according to an exemplary application of the present invention.

For two-phase flow, 33 points are measured, varying both liquid and gas surface velocity. Speeds are used to obtain different flow patterns. For the two-phase case, the Barnea, Luninski and Taitel flow pattern map, shown in FIG. 6, is used to classify the observed patterns and surface gas and liquid velocities for each experimental point. FIG. 6 also shows the patterns observed during the experimental stage, in which $V_{sl}$ is the surface velocity of the liquid and $V_{sg}$ is the surface velocity of the gas.

Figure 7:
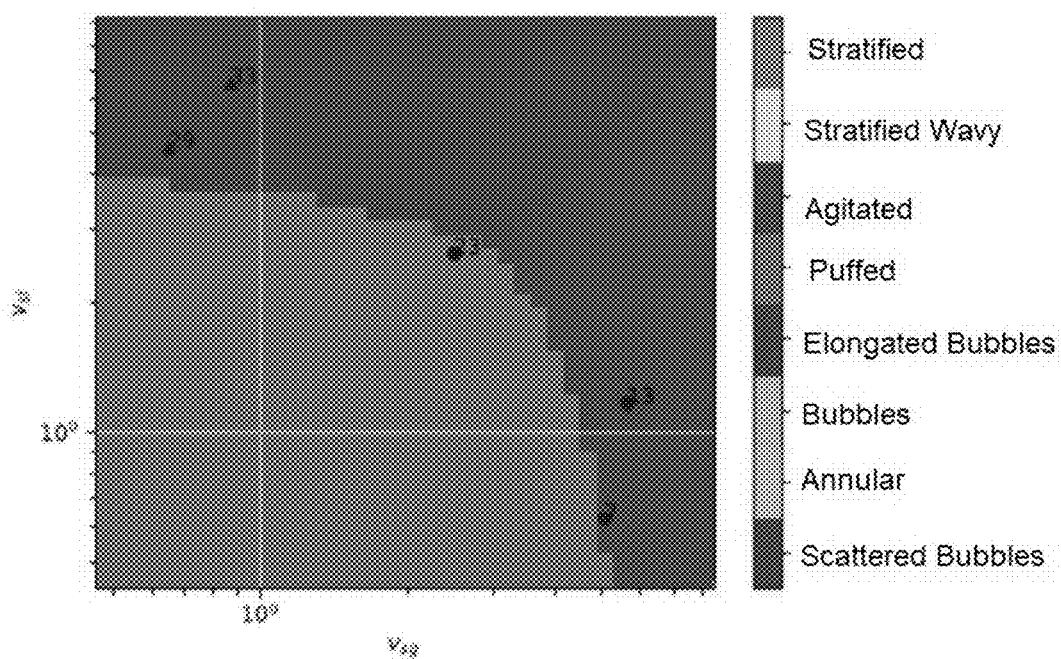
FIG. 7 shows a flow pattern map and part of the experimental points considered, according to an exemplary application of the present invention.

Furthermore, the results of tests conducted for two-phase flow are presented below. Particularly, the frequency responses are presented, through DEP, and the dispersion curves for some experimental points. At the end, the results for estimating the void fraction for all experimental points are presented. The estimates are compared with the state-of-the-art void fraction model known as the Unified Model. It is worth mentioning that for the tests carried out, the structure of the test section is excited by the flow itself, so that, to estimate the dispersion curves, only the three accelerometers (T01, T02, V00) were used, one of them being the reference (T02). The phase difference between the measurement accelerometers (T01, V00) and the reference accelerometer (T02) is sufficient to estimate the dispersion curve, using the three-point method above described. The use of excitation by the flow itself is justified by the fact that turbulence excites the structure in a wide frequency band. For the analysis, five experimental points are selected, in which for two thereof the intermittent pattern is observed (points 7 and 13), in one point the transition between intermittent and scattered bubbles is observed (point 23), and in two points the scattered bubble pattern is observed (points 29 and 33). The points analyzed are shown on the flow pattern map in FIG. 7, where $v_{sl}$ is the surface velocity of the liquid and $v_{sg}$ is the surface velocity of the gas.

Figure 8:
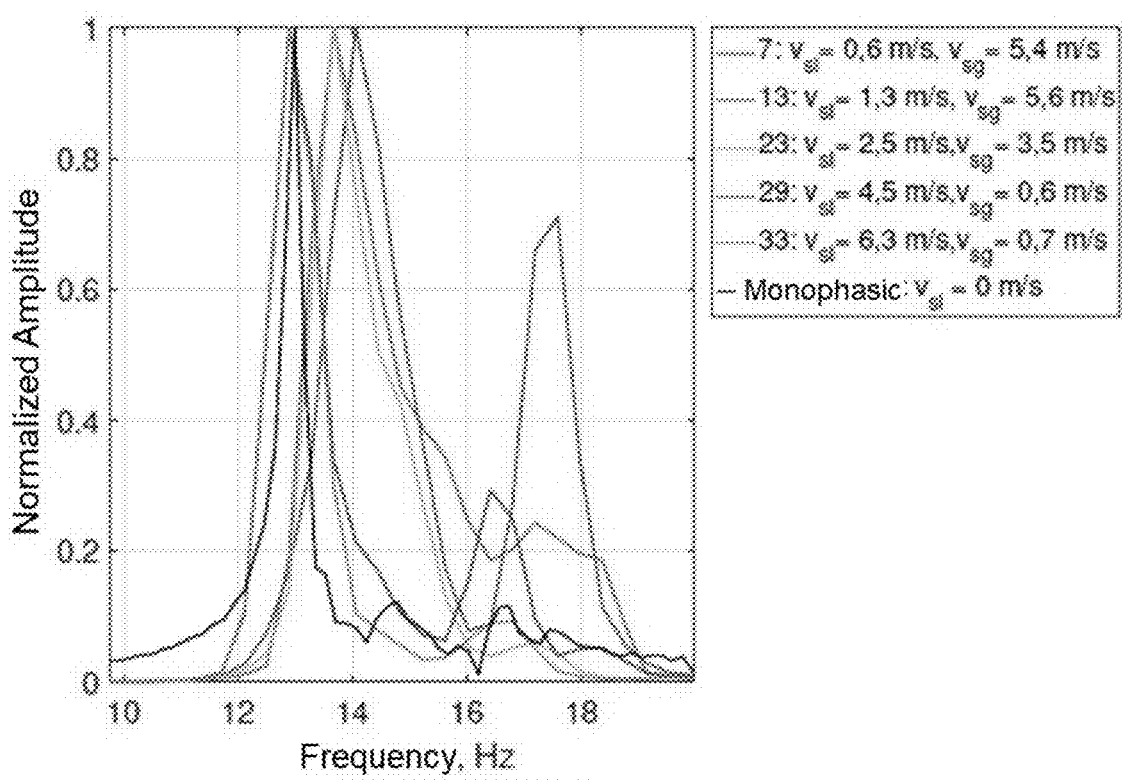
FIG. 8 shows the power spectral density for five experimental points and the frequency response function for the case without flow, in which all cases are normalized by the maximum amplitude, according to an exemplary application of the present invention.

First, the DEP of five experimental points is presented in FIG. 8. The FRF of the pipeline filled with water but without flow is also shown for comparison. DEPs are normalized by the maximum peak value, for each experimental point, in order to facilitate visualization. A strong influence of the flow pattern on the frequency response is observed. For experimental points 7 and 13, the intermittent pattern was observed, both in FIG. 7 (points identified with a circle) and by direct observation obtained by the high-speed camera. Point 23 is on the transition line between intermittent patterns and scattered bubbles and points 29 and 33 are scattered bubbles (identified with a triangle in FIG. 7).

It is evident that, for the scattered bubbles patterns, points 29 and 33, peak resonant frequency coincides with peak for non-flowing pipeline filled with water. Thus, it can be concluded that, due to the greater mass of water inherent to the dispersed bubble patterns, the natural frequency of the structure is close to the natural frequency of the pipeline filled with water.

Figure 9:
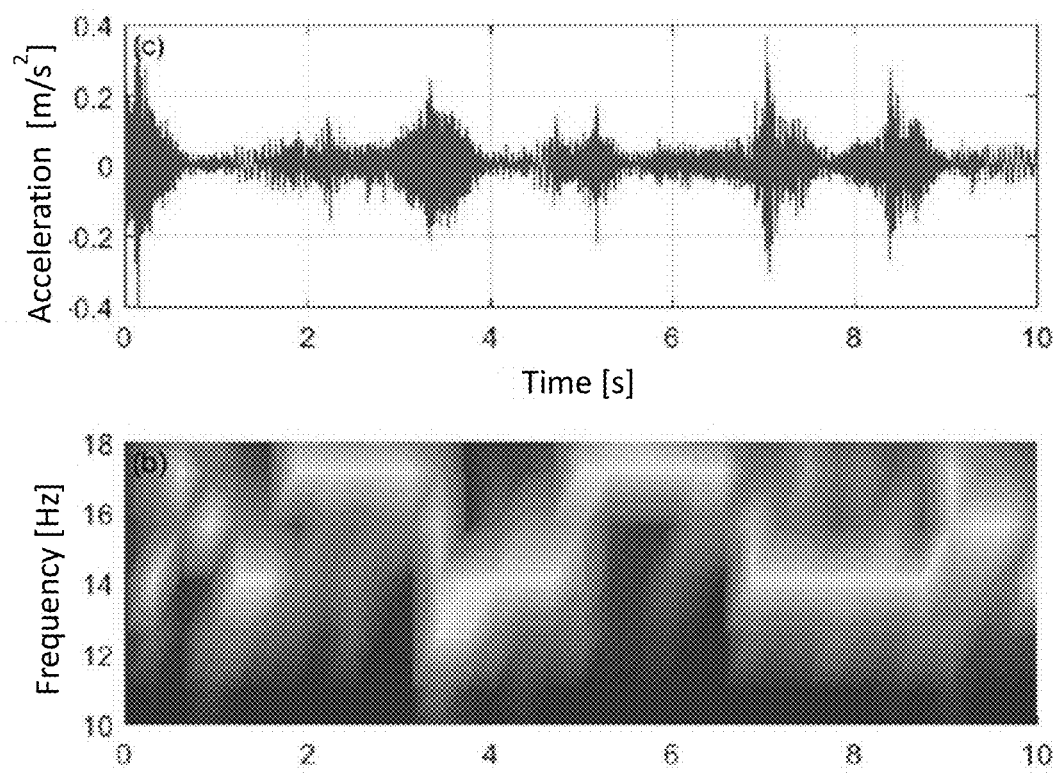
FIG. 9 shows the frequency spectrum over the time for the experimental point 7 (a), according to an exemplary application of the present invention.

For the intermittent patterns (points 7 and 13), two interesting phenomena are observed. First, there is an increase in the first natural frequency, due to the reduced specific mass of the mixture in the tube, caused by the presence of elongated bubbles and liquid pistons inflated by small bubbles. Second, the appearance of a second frequency peak for points 7, 13 and 29 is observed. The appearance of the second peak is explained by the alternation between gas bubbles and liquid piston, in the intermittent patterns. During the period in which the gas bubble passes through the sensors, the structure assumes a different natural frequency value for the period over which the liquid piston passes, since the added mass differs from one situation to another. As DEPs are estimated from an average of samples of the same temporal signal, the final result is an average DEP of the elongated bubble and the liquid piston. Dividing the signal in time into small sections, in order to isolate the bubble and piston region and estimating the DEP for each section, it is possible to observe the variation of the natural frequency over the time. 10 blocks of 0.85 seconds each are used. FIG. 9 presents this result for experimental point 7.

Figure 10:
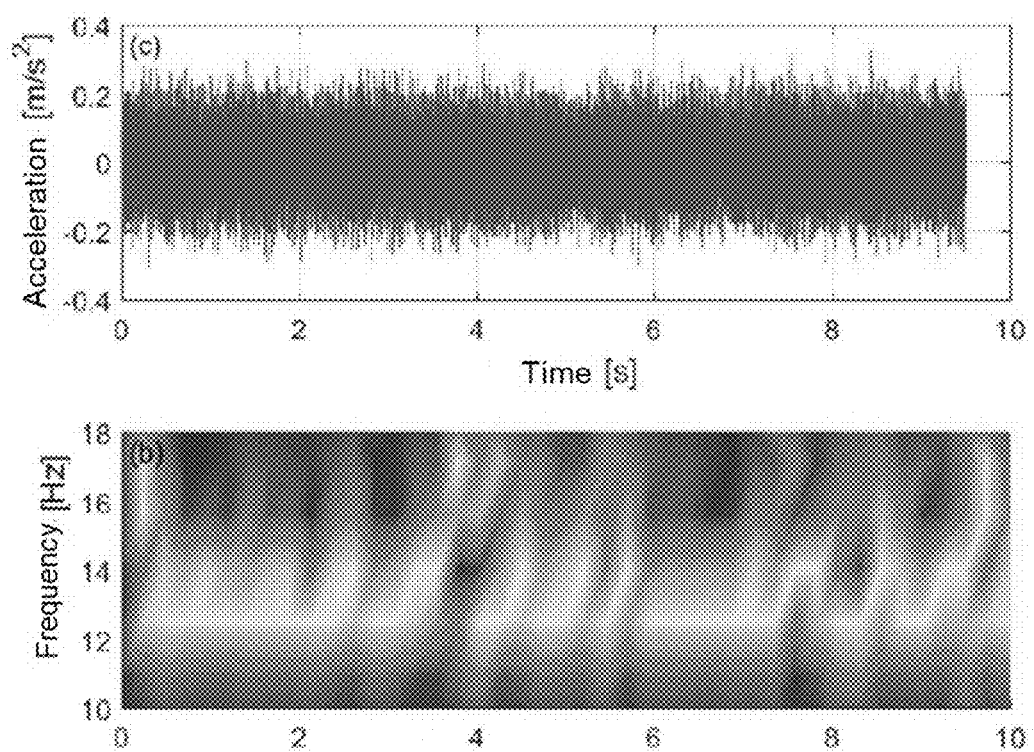
FIG. 10 shows the frequency spectrum over the time for the experimental point 33 (b), according to an exemplary application of the present invention.

Note that depending on the length of the temporal signal, the peak frequency approaches 18 Hz (elongated bubble) or 14 Hz (liquid piston). If compared with the scattered bubble pattern at point 33 (FIG. 10), it is possible to note that peak frequency remains constant throughout the entire signal.

For point 23, which is in the transition between the intermittent regime and the scattered bubbles, the DEP has a peak frequency slightly higher than the frequency of the dispersed bubbles, due to the fact that there are still short bubbles present in the flow, but it does not have second peak.

Dispersion curves are estimated using the three-point method. The fitted curve, like that previously demonstrated in an exemplary manner in FIG. 5, is now shown for each case and added to the results as the orange line in FIGS. 11 to 15. The curves representing the lower (single-phase gas) and upper (single-phase liquid) limits are also added to the results as black dashed lines.

Figure 16:
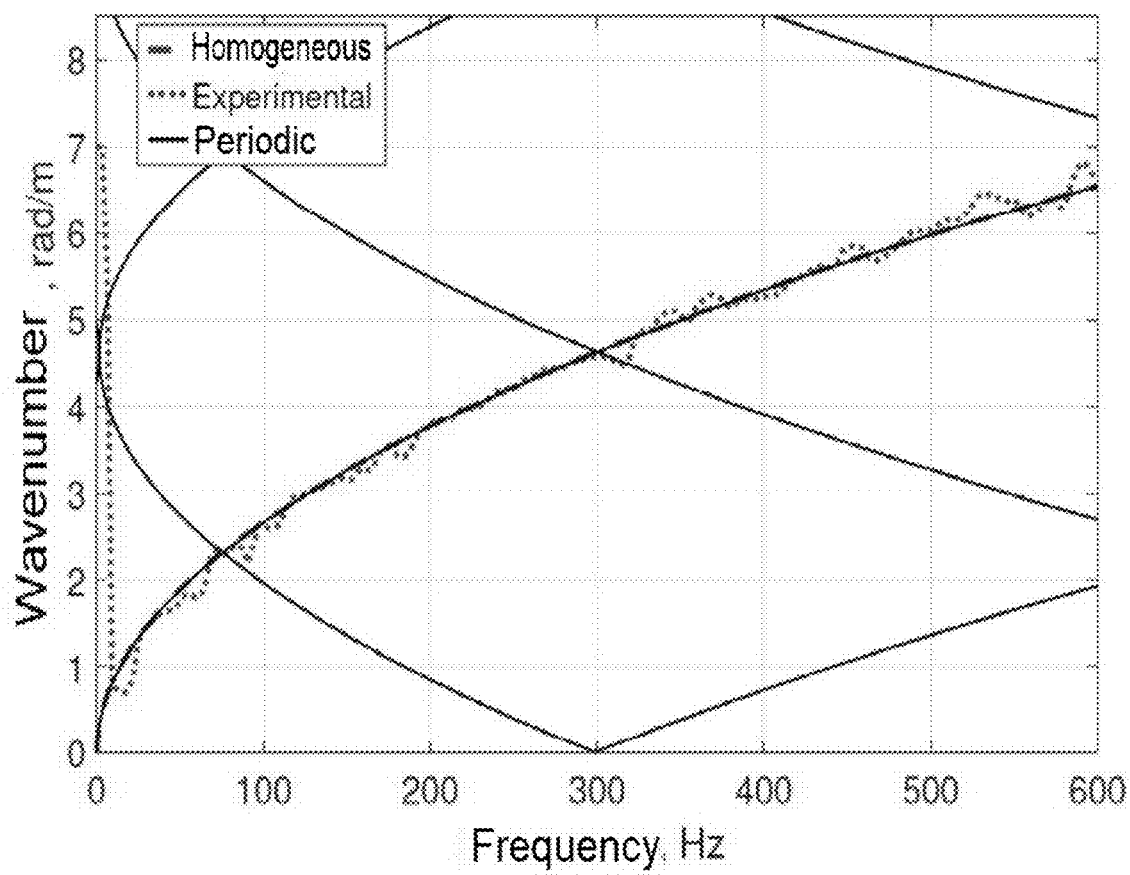
FIG. 16 presents analytical dispersion curves considering analytical periodic and homogeneous flow, and experimental curve, according to an exemplary application of the present invention.

First, the dispersion curve is evaluated considering periodic flow, for experimental point 8, with superficial gas velocity (vsg)=0.70 m/s and liquid superficial velocity (vsl) =1.33 m/s and the piston and Taylor bubble lengths of 0.70 m and 0.63 m, respectively. The curve is compared with the experimental and analytical curves considering homogeneous flow. It can be seen in FIG. 16 that the analytical curves for periodic and homogeneous flow coincide, and that the width of the "band gap" (region in which the waves do not propagate due to the destructive interferences that occur in some frequency bands) is short due to the reduced value of the ratio between the linear mass density of the fluid and the structure. This same comparison was performed for the other experimental points in which the intermittent pattern was observed. Thus, the homogeneous model can be used to fit the experimental curve.

Figure 11:
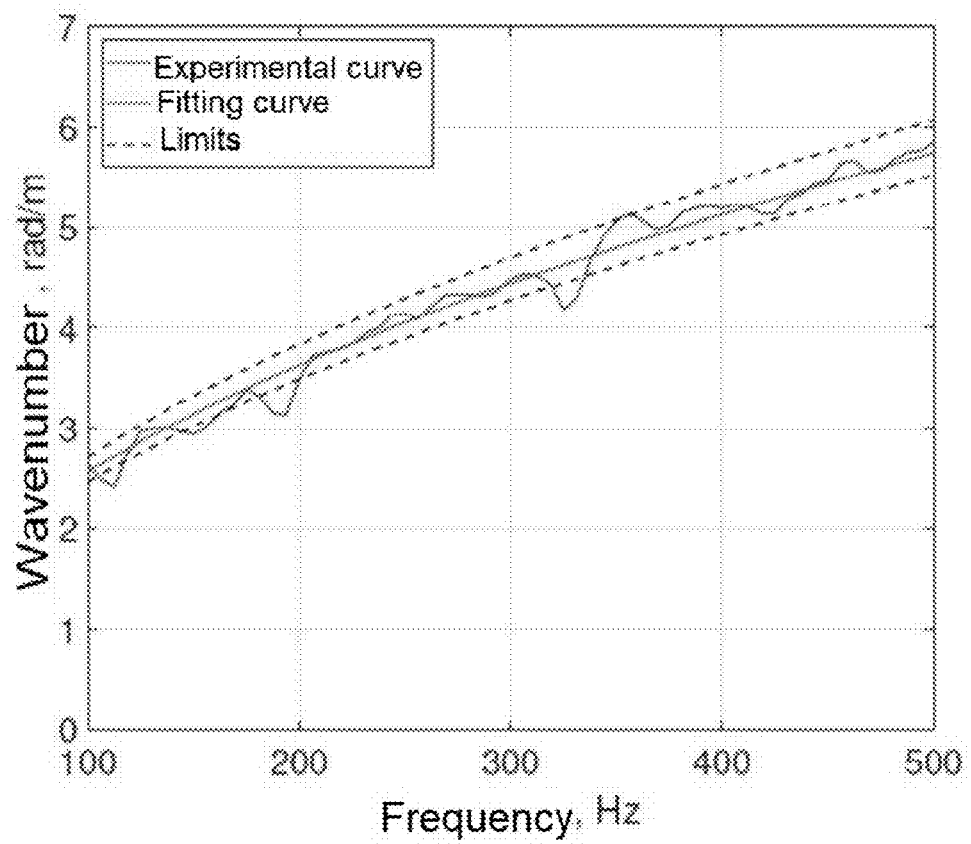
FIG. 11 shows an experimental dispersion curve and a fitted curve for the experimental point 7 (a), where the upper and lower limits indicate cases with only gas or only liquid, according to an exemplary application of the present invention.
Figure 12:
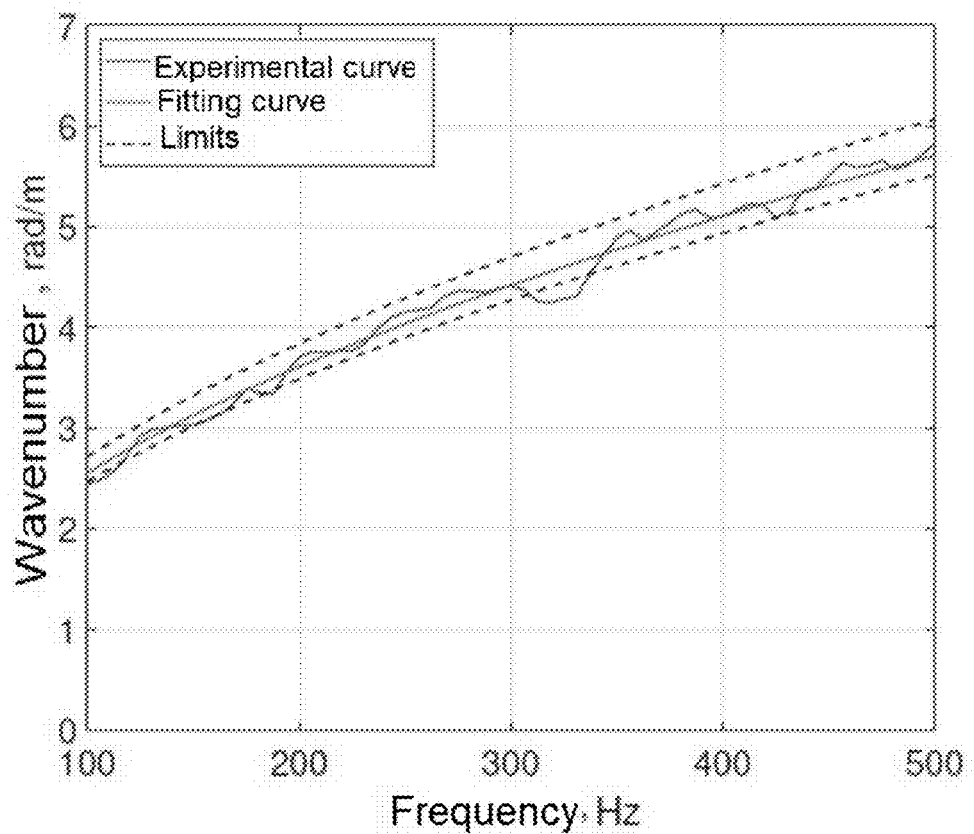
FIG. 12 shows an experimental dispersion curve and a fitted curve for the experimental point 13 (b), where the upper and lower limits indicate cases with only gas or only liquid, according to an exemplary application of the present invention.
Figure 13:
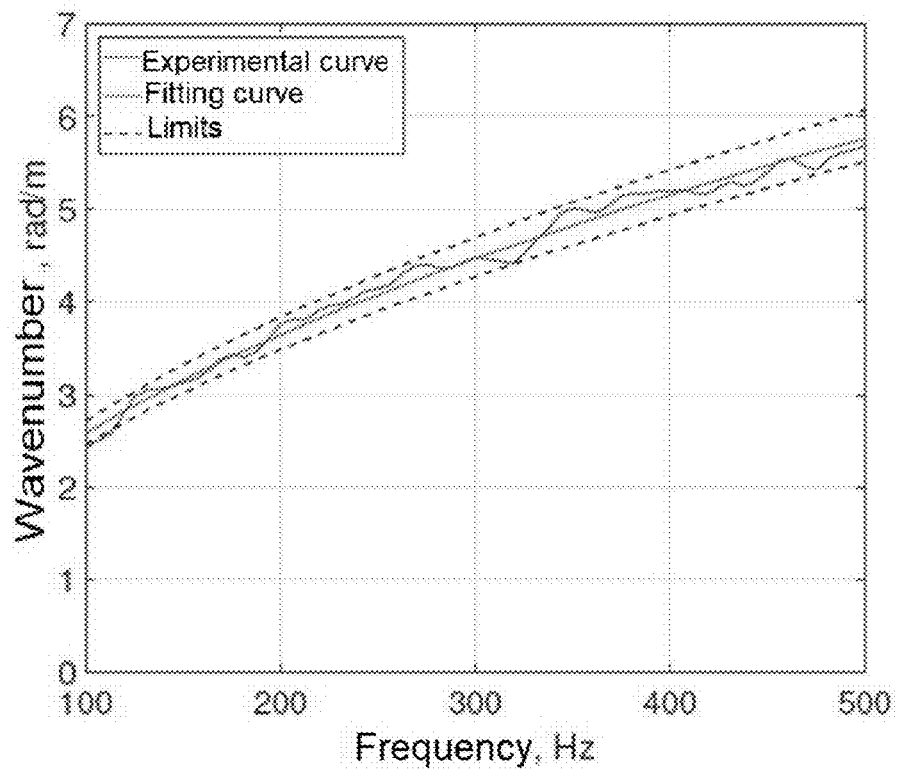
FIG. 13 shows an experimental dispersion curve and a fitted curve for the experimental point 23 (c), in which the upper and lower limits indicate cases with only gas or only liquid, according to an exemplary application of the present invention.
Figure 14:
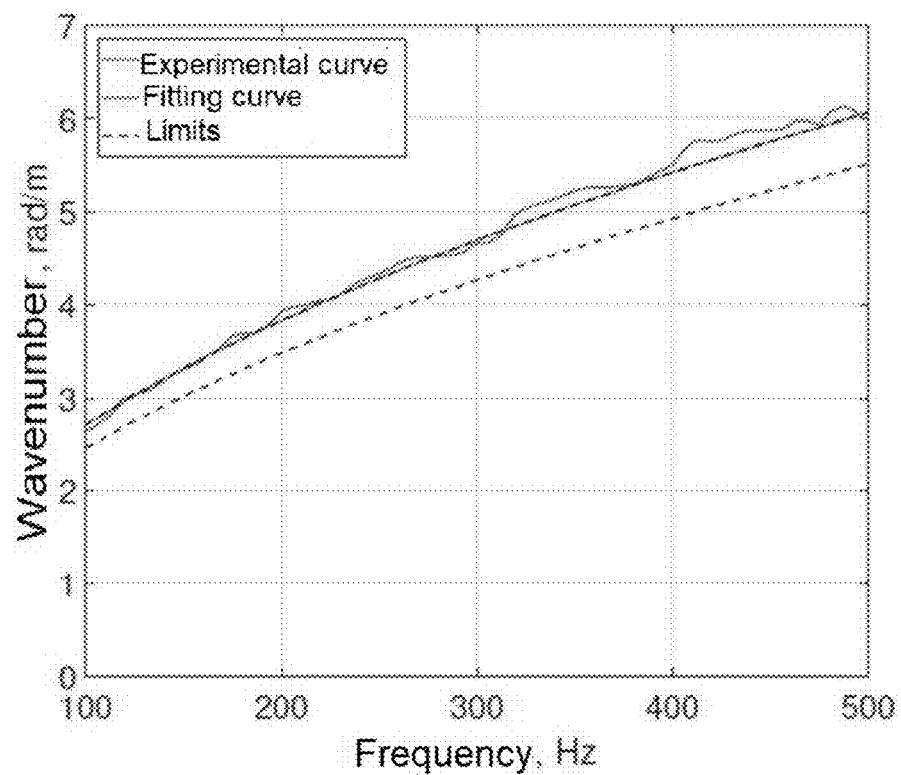
FIG. 14 shows an experimental dispersion curve and a fitted curve for the experimental point 29 (d), where the upper and lower limits indicate cases with only gas or only liquid, according to an exemplary application of the present invention.
Figure 15:
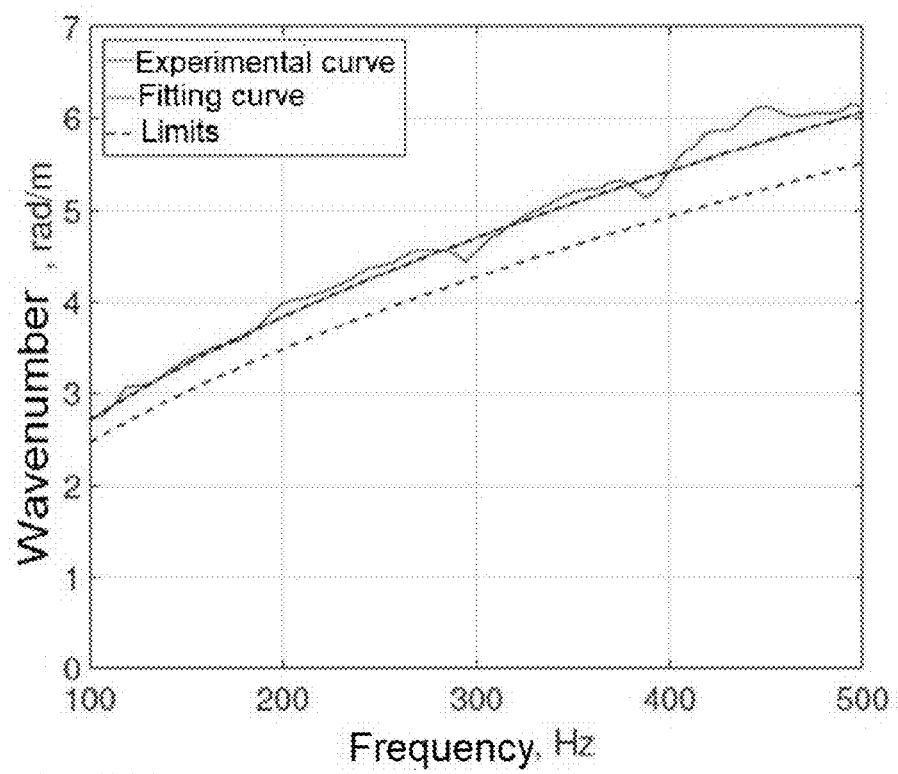
FIG. 15 shows an experimental dispersion curve and a fitted curve for the experimental point 33 (e), where the upper and lower limits indicate cases with only gas or only liquid, according to an exemplary application of the present invention.

Then, the dispersion curves are evaluated considering homogeneous flow. It's possible note in FIGS. 14 and 15 that, for cases in which the observed pattern is that of dispersed bubbles, the fitted curves approach the upper limit, indicating a greater mass of liquid present in the pipe. In FIGS. 11 to 13, the fitted curve is between the limits, indicating the presence of gas and water.

Implementation Example: Experimental Results for Estimating the Void Fraction

Below are shown the results obtained to estimate the void fraction from the estimated dispersion curve.

The constant coefficient of fitting is determined and applied to the relationship in equation (11) below to obtain the specific mass of the mixture, from which the void fraction is determined:

$$E = \frac{(2\pi f_n)\rho A_t L^4}{I(\lambda L)^4} \quad (11)$$

Where E is the modulus of elasticity of the pipe, fn is the first peak frequency, ρ is the specific mass of the tube, $A_t$ is the cross-sectional area, L the length, I is the second moment of area and λ the corresponding eigenvalue to the boundary condition, which for the present case has a value of 4.73.

Figure 17:
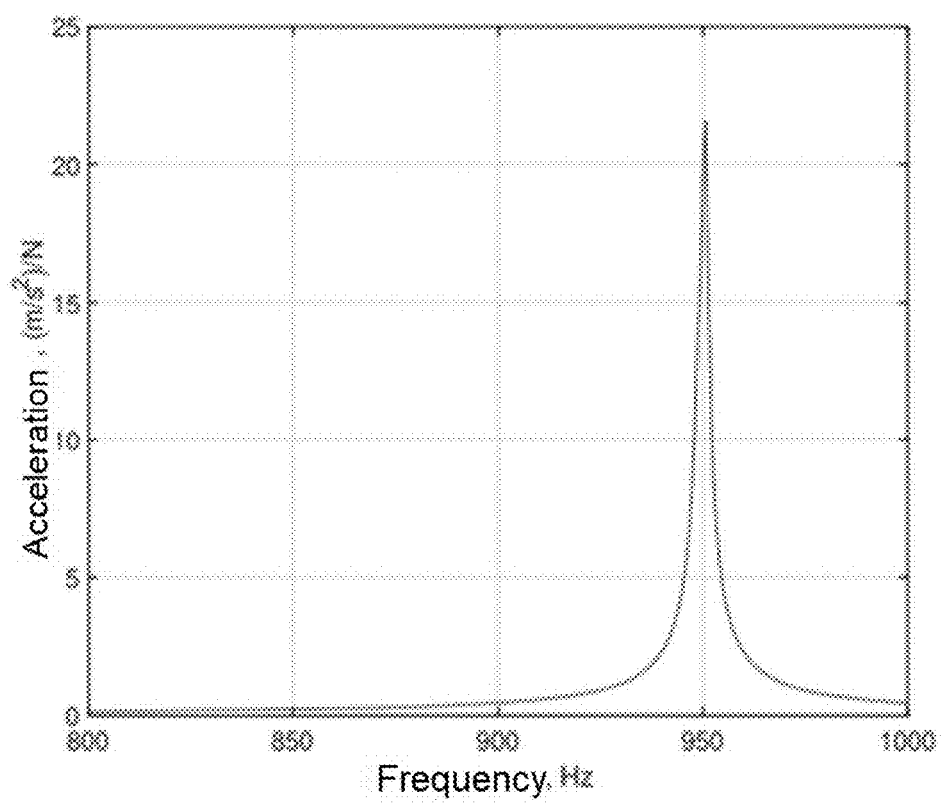
FIG. 17 shows the frequency spectrum of the pipe section and the first natural frequency, according to an exemplary application of the present invention.

A 0.622 m long, 50.8 mm internal diameter and 3.5 mm thick pipeline is used. The specific mass of the material is determined using a precision balance and calculating the volume. The value found for the specific mass is 7270.4 kg/m3. The dynamic test is carried out on a foam to simulate the boundary conditions of both free ends. The pipe section is excited using an impact hammer, and the response is measured using a single accelerometer. The acceleration and forcing signal are processed through the DEP and determination of the frequency response estimator. The frequency spectrum of the tube section is shown in FIG. 17.

From the peak frequency of 950.6 Hz and the relationship of equation (11), the modulus of elasticity was estimated with a value of 209.52 GPa.

Figure 18:
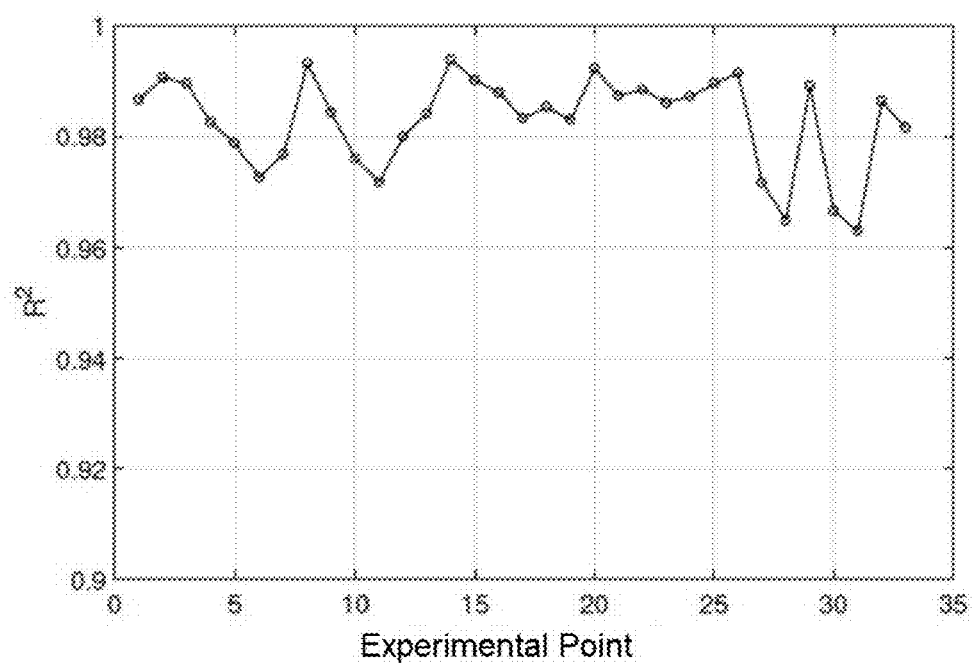
FIG. 18 shows a determination coefficient $R^2$ of curve fitting for all experimental points, according to an exemplary application of the present invention.

To check the quality of the fitting curve, the determination coefficient $R^2$ is calculated for all points, these are presented in FIG. 18, by experimental point. All fits returned a determination coefficient greater than 0.96 indicating a good fit quality.

The methodology is applied to all experimental points and the results are shown in FIGS. 19 to 24. The void fractions obtained by the Tulsa Unified Model are used for comparison, although it may also present errors in the estimation of the void fraction. The error bars in the experimental estimate are calculated from the estimated measurement uncertainty. The results are divided into three figures for different cases of superficial liquid velocity as a function of superficial gas velocity.

Figure 19:
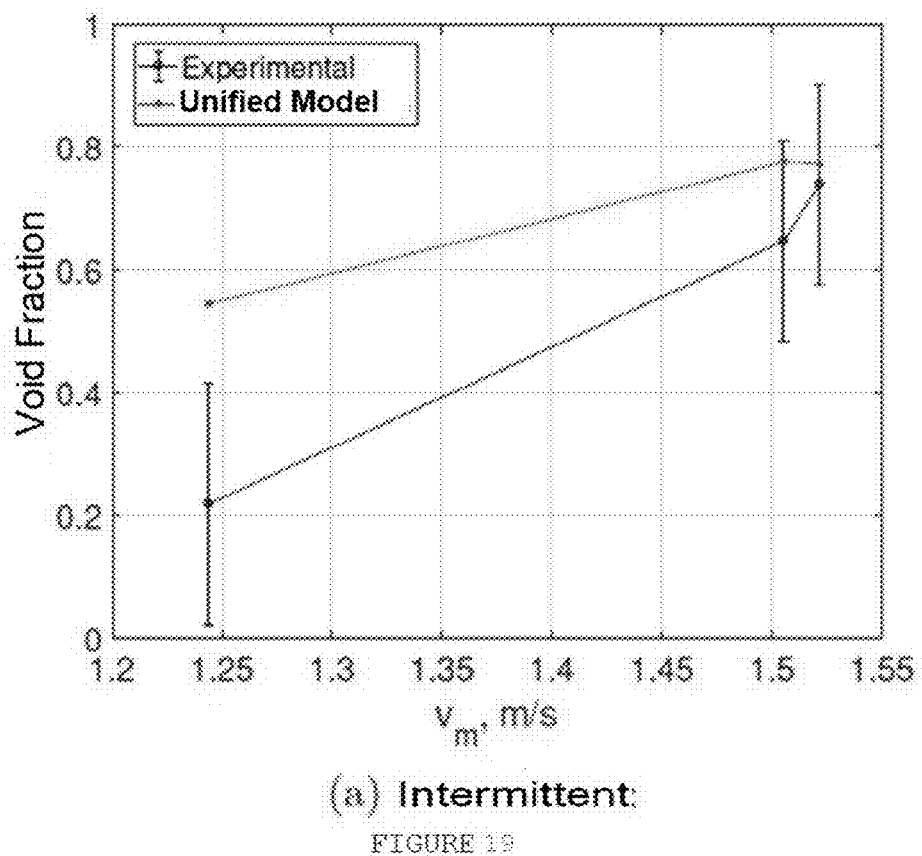
FIG. 19 shows the void fraction estimated by the dispersion curve as a function of the mixing velocity compared to the state-of-the-art unified model for the intermittent flow pattern, according to an exemplary application of the present invention.
Figure 20:
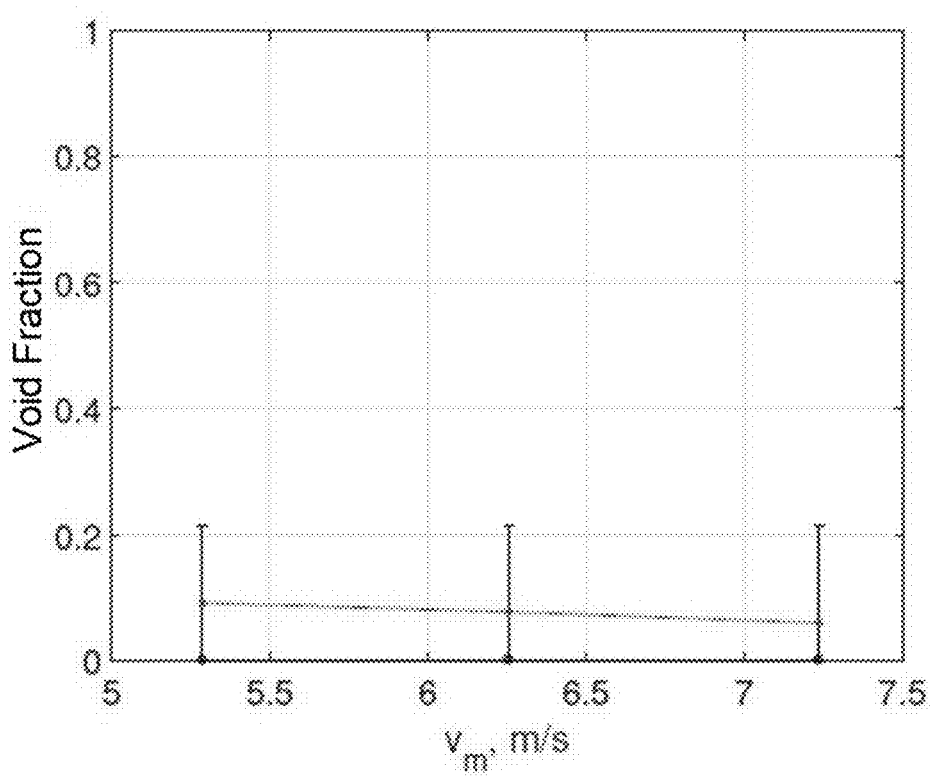
FIG. 20 shows the void fraction estimated by the dispersion curve as a function of the mixing velocity compared to the state-of-the-art unified model for the flow pattern of dispersed bubbles, according to an exemplary application of the present invention.
Figure 21:
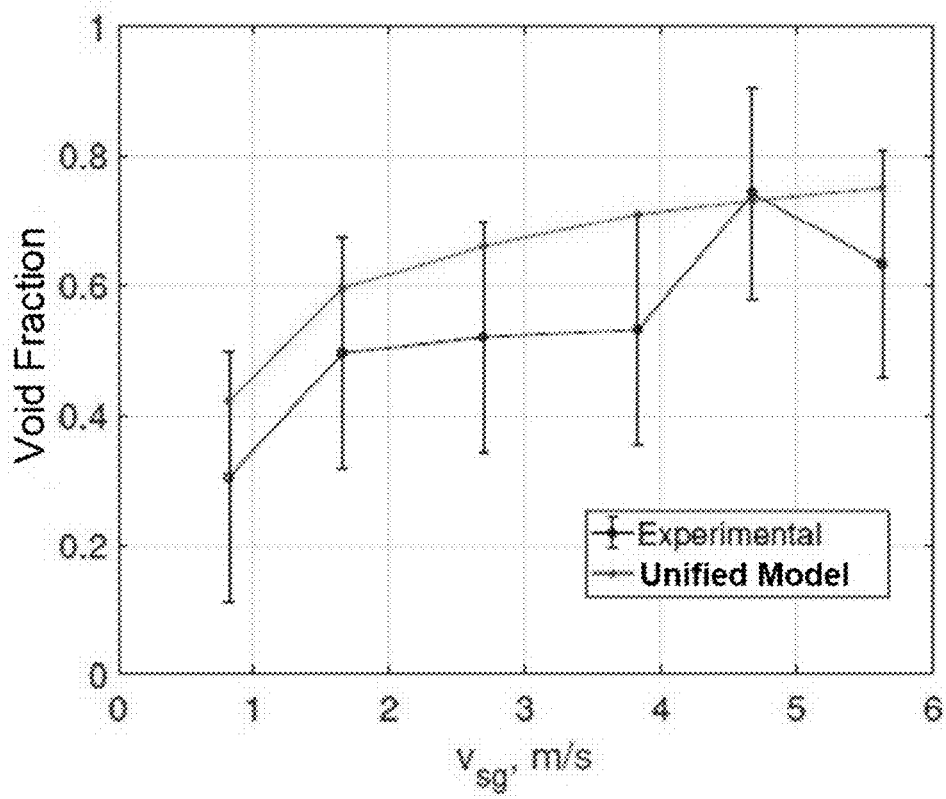
FIG. 21 presents the void fraction estimated by the dispersion curve as a function of the superficial gas velocity for a given superficial liquid velocity compared to the unified model of the state of the art, according to an example of application of the present invention.
Figure 22:
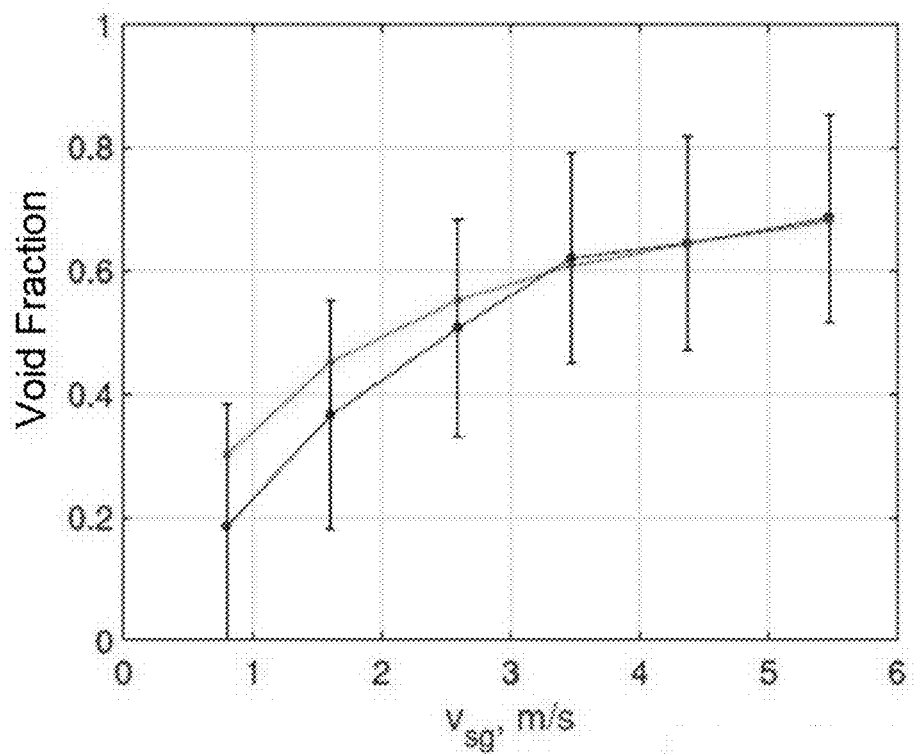
FIG. 22 presents the void fraction estimated by the dispersion curve as a function of the superficial gas velocity for a given superficial liquid velocity compared to the unified model of the state of the art, according to an example of application of the present invention.
Figure 23:
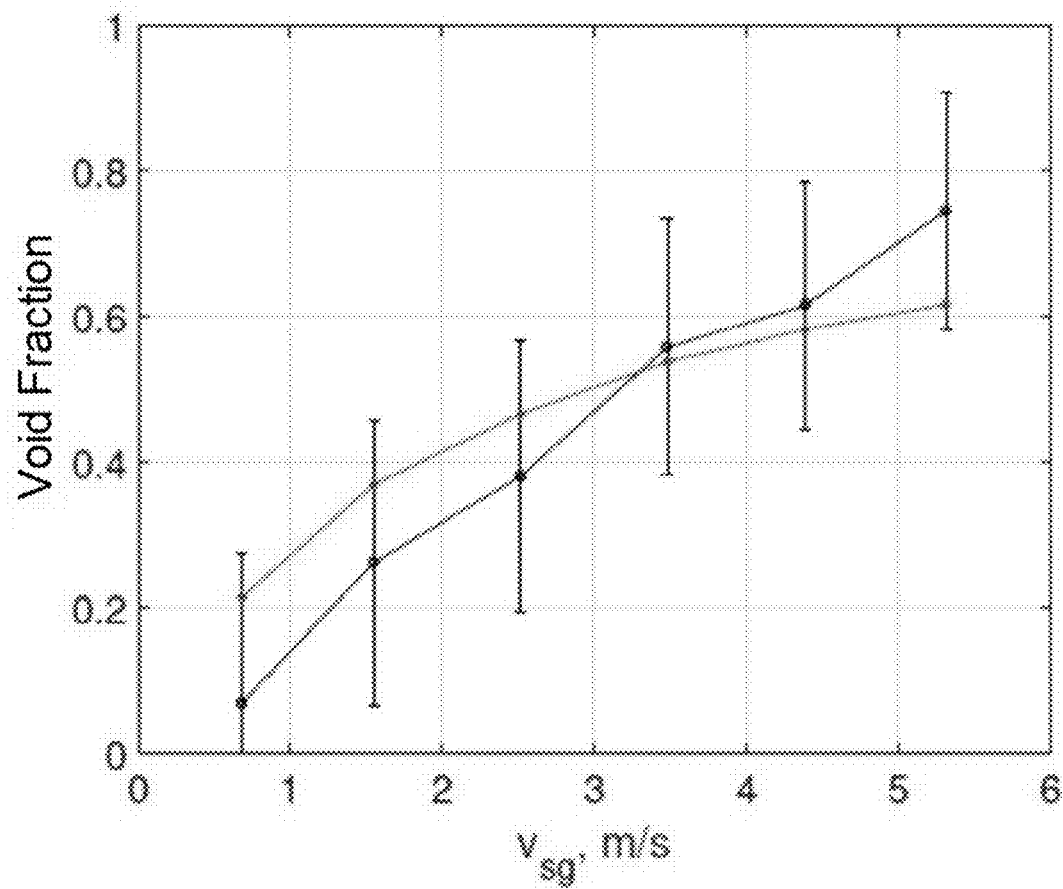
FIG. 23 shows the void fraction estimated by the dispersion curve as a function of gas surface velocity for a given liquid surface velocity compared to the unified state model technique, according to an exemplary application of the present invention.
Figure 24:
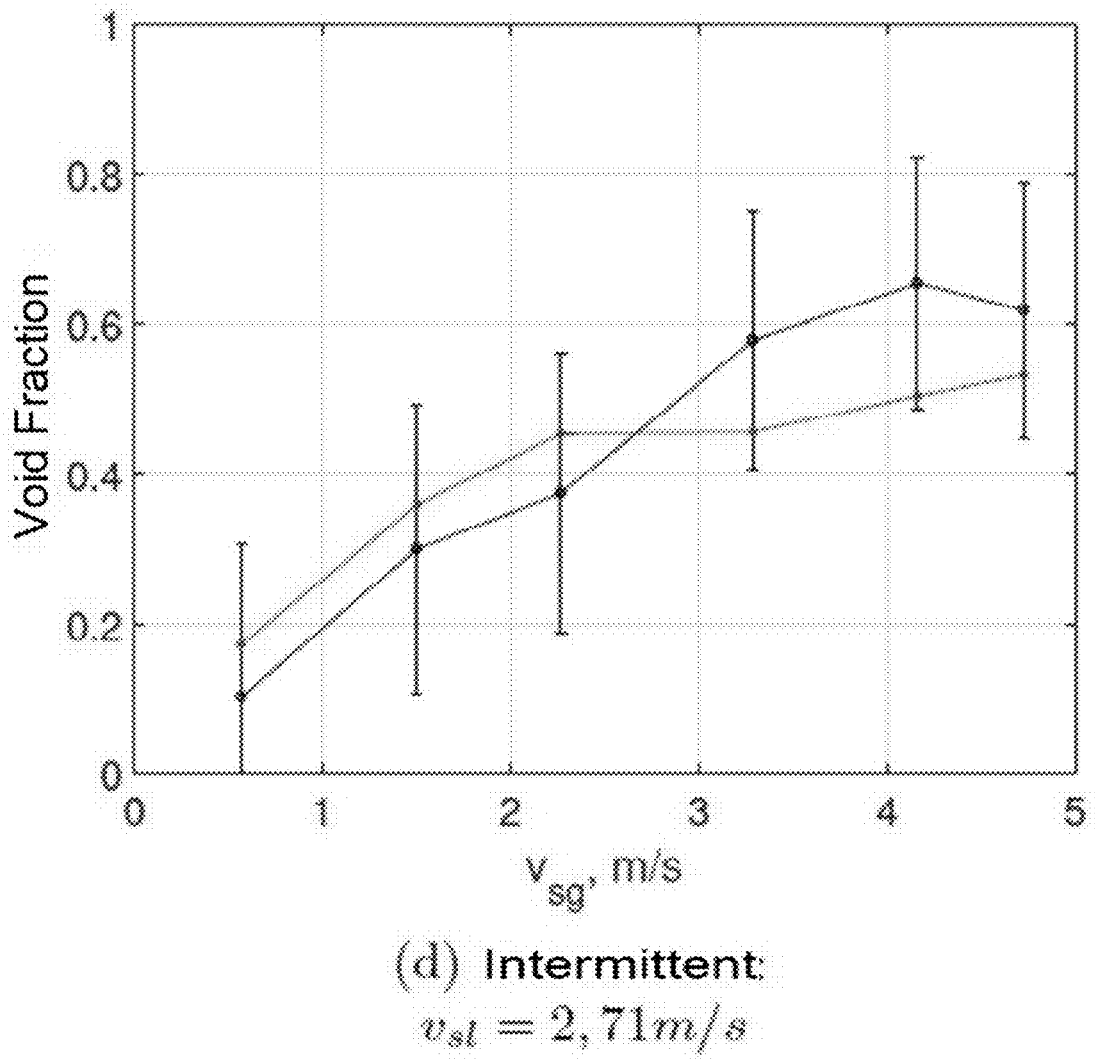
FIG. 24 presents the void fraction estimated by the dispersion curve as a function of the superficial gas velocity for a given superficial liquid velocity compared to the unified model of the state of the art, according to an example of application of the present invention.
Figure 25:
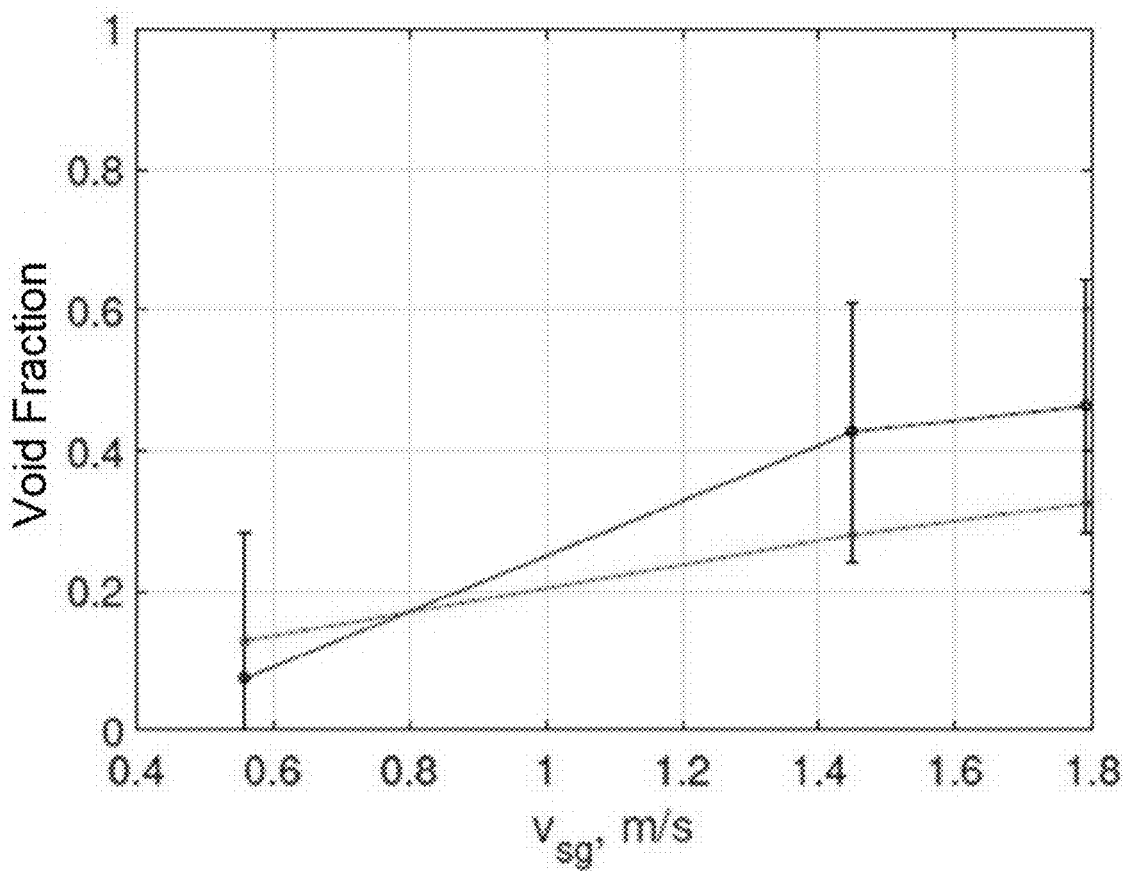
FIG. 25 presents the void fraction estimated by the dispersion curve as a function of the superficial gas velocity for a given superficial liquid velocity in comparison with the unified model of the state of the art, according to an example of application of the present invention.

FIGS. 19 and 20 show the results in terms of mixing speed, since the experimental tests corresponding to points 1, 29, 30, 31, 32 and 33 were performed for different combinations of gas and liquid surface velocity, as seen in FIG. 6. In general, a good agreement is observed, within the measurement uncertainty, between the experimental estimates, obtained with the proposed method, and the analytical estimates, obtained through the Tulsa Unified Model.

Among the intermittent patterns, FIGS. 21 to 25, the cases in which the best approximation is obtained are those in which the superficial liquid velocities are $v_{sl}$=1.93 m/s, $v_{sl}$=1.32 m/sec $v_{sl}$=2.71 m/s. For the case where $v_{sl}$=0.67 m/s, the void fraction estimated by the Unified Model is consistently higher than that estimated experimentally. This may indicate some estimation bias either in the analytical model or in the proposed method and needs to be investigated in more detail. These are well-defined cases within intermittent patterns.

For estimation cases with scattered bubble pattern, the proposed estimation method consistently provides void fractions close to zero. That is due to the small mass variation, and consequent small void fraction values, due to dispersed bubbles. This result is mainly associated with the low sensitivity of the steel duct in relation to small variations in the void fraction, as observed in other experimental tests. It is important to emphasize that, despite the Tulsa Unified Model being used as a reference value, the results obtained still need to be compared with another experimental technique for direct measurement of the void fraction, given that the model may present errors in relation to the actual values in situ.

Figure 26:
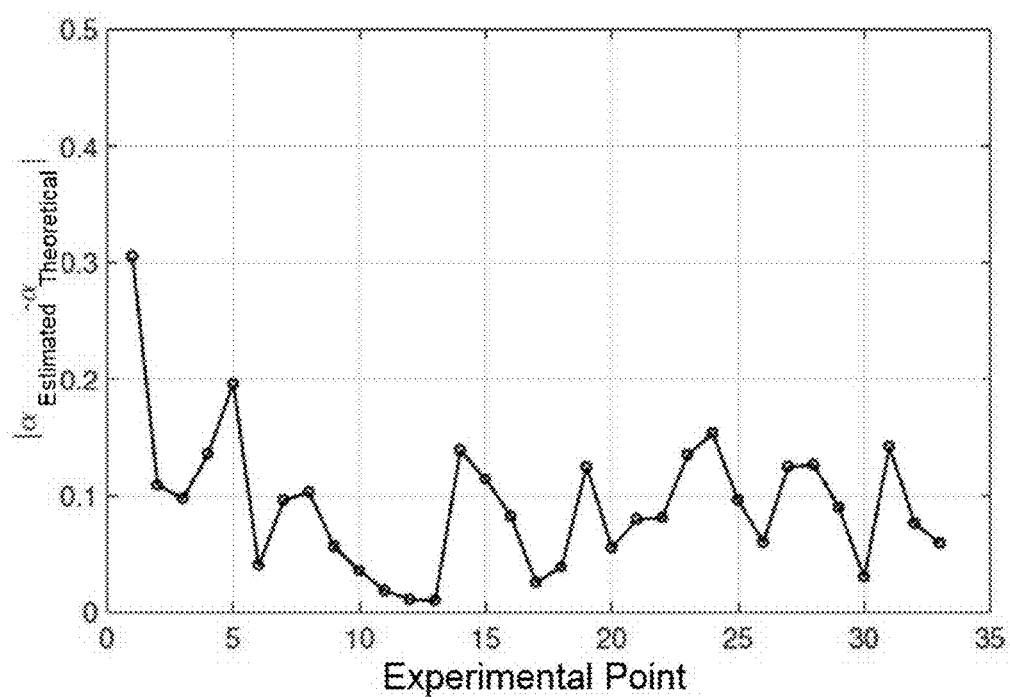
FIG. 26 presents the absolute difference between the void fraction estimated by the proposed method and by the unified Tulsa model, from the state of the art, for the experimental points, according to an exemplary application of the present invention.

The absolute error between the estimated void fraction and the analytical one is shown in FIG. 26. For 94% of the experimental points, an absolute error of less than 0.15 was obtained.

It is worth noting that for the present work, a steel pipeline with a stiffness of 46.305, 35 $Nm^2$ and linear mass density of 4.34 kg/m was used.

Additional experimental studies demonstrate that the greater the ratio between the fluid linear mass density and the structure linear density, the more sensitive it is to variations in the void fraction and the less is the influence of the noise on the estimation. That is, it is possible to speculate that if the proposed technique was applied to a PVC pipeline, possibly the experimental estimates would be substantially better. Furthermore, the proposed approach does not depend on global parameters of the structure, such as the first natural frequency, which is very sensitive to boundary conditions and can undergo substantial changes, even during pipeline operation.

Advantages and Modifications

The methods, systems and devices of the present invention adopt a simplified, wave-based approach, which depends only on the local geometry and material properties of the pipeline and can be used to estimate the void fraction in any part of a pipeline, without the need of knowing its length and boundary conditions in advance. In addition, there is only the need to use at least three accelerometers, non-intrusive sensors and that are easy to apply, remove and relocate in the structure.

The invention claimed is:

1. A method for measuring characteristics of a multiphase flow from structural vibration signals, the method comprising:
    obtaining, by means of acceleration sensors fixed externally to a pipeline, signals based on the pipeline internal flow vibration;
    processing, by means of a processing device, the obtained signals;
    determining a dispersion curve fitting coefficient to determine the void fraction of the mixture; and
    controlling a flowrate of a pump, by the processing device, based at least in part on the determined void fraction of the mixture.

2. The method according to claim 1, characterized in that processing the obtained signals also comprises obtaining the Power Spectral Densities (DEPs) and the Frequency Response Functions (FRFs) for each one of the obtained signals.

3. The method according to claim 1, characterized in that it also includes obtaining a wave dispersion curve with the DEPs from each acceleration sensor (T01, T02, V00).

4. The method according to claim 1, further comprising:
    obtaining a maximum frequency of vibration;
    determining the bending wavelength from the maximum frequency; and
    calculating a minimum positioning distance between two consecutive sensors based on the determined wavelength and through the maximum wavenumber as follows:

$$d = \frac{\Pi}{k_{máx}}$$

wherein:
    d is the minimum distance; and
    $K_{máx}$ is the maximum wavenumber.

5. The method according to claim 1, wherein the dispersion curve fitting coefficient is used to determine the specific mass of the mixture according to the following equation:

$$a = \sqrt[4]{\frac{\rho_t A_t + \rho_m A_i}{EI}}$$

wherein:
    a is the fitting coefficient;
    $\rho_t$ is the specific mass of the pipeline material;
    $\rho_m$ is the specific mass of the mixture;
    EI is the flexural stiffness of the pipe;
    At is the cross-sectional area of the pipe; and
    Ai is the area of the inner section of the pipe.

6. The method according to claim 5, wherein the void fraction of the mixture is obtained from the specific mass of the mixture through the following relationship:

$$\rho_m = \alpha \rho_{gás} + (1-\alpha) \rho_{liquido}$$

wherein:
    $\alpha$ equals the void fraction value;
    $\rho_m$ is the specific mass of the mixture;
    $\rho_{gás}$ is the specific mass of the gas; and
    $\rho_{liquido}$ is the specific mass of the liquid.

7. A system for measuring characteristics of a multiphase flow from structural vibration signals characterized by comprising:
    at least three acceleration sensors; and
    a processing device;
    wherein the sensors are fixed externally to a pipeline and configured to obtain signals based on the pipeline internal flow vibration;
    wherein the processing device is configured to process the obtained signals and determine a dispersion curve fitting coefficient to determine the void fraction of the mixture; and
    wherein the processing device is configured to control a flowrate of a pump based at least in part on the determined void fraction of the mixture.

* * * * *